(12) United States Patent
Tiernan et al.

(10) Patent No.: US 8,757,071 B2
(45) Date of Patent: Jun. 24, 2014

(54) SOLID FUEL SKEWER SUSPENSION BURNING SYSTEM

(71) Applicant: AFS Technology, LLC, Tipp City, OH (US)

(72) Inventors: John J. Tiernan, Huber Heights, OH (US); Allen G. Bowman, Riverside, OH (US)

(73) Assignee: AFS Technology, LLC, Tipp City, OH (US)

(*) Notice: Subject to any disclaimer, the term of this patent is extended or adjusted under 35 U.S.C. 154(b) by 0 days.

(21) Appl. No.: 13/855,868

(22) Filed: Apr. 3, 2013

(65) Prior Publication Data

US 2013/0224673 A1    Aug. 29, 2013

Related U.S. Application Data

(63) Continuation of application No. PCT/US2011/055166, filed on Oct. 6, 2011.

(60) Provisional application No. 61/472,802, filed on Apr. 7, 2011, provisional application No. 61/390,822, filed on Oct. 7, 2010.

(51) Int. Cl.
*F23K 5/00* (2006.01)
*F23G 7/12* (2006.01)
*C10B 53/07* (2006.01)

(52) U.S. Cl.
USPC ............................ 110/289; 110/109; 110/346

(58) Field of Classification Search
CPC ..... C10B 53/07; F23G 2209/281; F23G 7/12; C10J 2300/0946; C04B 7/443; F27B 7/2033; C09C 1/482; F27D 2099/0051
USPC ........................ 110/109, 289; 198/487.1, 795
See application file for complete search history.

(56) References Cited

U.S. PATENT DOCUMENTS 3,946,680 A   3/1976 Laman
4,030,984 A * 6/1977 Chambers ...................... 201/25
(Continued)

FOREIGN PATENT DOCUMENTS

DE   2343954 A1   3/1975
EP   0568202 A1   11/1993
(Continued)

OTHER PUBLICATIONS

Notification of Transmittal of the International Search Report and the Written Opinion of the International Searching Authority for PCT Application No. PCT/US2011/055166, filed Oct. 6, 2011, mailing date of May 21, 2012, Korean Intellectual Property Office, Republic of Korea.

(Continued)

*Primary Examiner* — Kenneth Rinehart
*Assistant Examiner* — David J. Laux
(74) *Attorney, Agent, or Firm* — Thomas E. Lees, LLC

(57) ABSTRACT

A skewer system comprises a skewer rod that holds tires in suspension during an incineration process where the tires are burned for fuel in a kiln such as a cement kiln or a lime kiln. In certain implementations, the skewer system also comprises a fuel advancing system to advance tires loaded onto the skewer rod into the heated gas in a stationary heat transfer station of the kiln. In further exemplary implementations, the skewer system comprises a mechanism to recover wire remnants from incinerated tires, the wire can be cut off the skewer and dropped into the kiln, or the wire itself can be burned off.

20 Claims, 13 Drawing Sheets

(56) References Cited

U.S. PATENT DOCUMENTS

| | | | |
|---|---|---|---|
| 4,295,823 A | 10/1981 | Ogawa et al. | |
| 4,551,051 A * | 11/1985 | Hofbauer et al. | 110/246 |
| 4,850,290 A | 7/1989 | Benoit et al. | |
| 5,078,594 A | 1/1992 | Tutt et al. | |
| 5,122,189 A | 6/1992 | Garrett et al. | |
| 5,224,433 A | 7/1993 | Benoit et al. | |
| 5,339,751 A | 8/1994 | Tutt | |
| 5,473,998 A | 12/1995 | Allen et al. | |
| 5,730,073 A * | 3/1998 | Kobata | 110/346 |
| 5,806,442 A * | 9/1998 | Aldred et al. | 110/246 |
| 5,816,795 A | 10/1998 | Hansen et al. | |
| 5,989,017 A | 11/1999 | Evans | |
| 6,210,154 B1 | 4/2001 | Evans et al. | |
| 6,213,764 B1 * | 4/2001 | Evans | 110/245 |
| 6,345,981 B1 | 2/2002 | Hansen et al. | |
| 6,875,015 B1 * | 4/2005 | Tiernan | 110/346 |
| 2002/0017226 A1 | 2/2002 | Largent | |
| 2006/0169181 A1 | 8/2006 | Youn et al. | |
| 2006/0254482 A1 * | 11/2006 | Kohnen | 110/102 |
| 2009/0047102 A1 | 2/2009 | Seirlehner et al. | |
| 2009/0291403 A1 | 11/2009 | Conti et al. | |

FOREIGN PATENT DOCUMENTS

| | | |
|---|---|---|
| EP | 0803693 A2 | 10/1997 |
| GB | 1345456 | 1/1974 |
| GB | 2034014 A | 5/1980 |
| GB | 2312494 A | 10/1997 |
| JP | 5172322 A | 7/1993 |
| JP | 7091633 A | 4/1995 |
| JP | 8094044 A | 4/1996 |
| WO | 9213245 A1 | 8/1992 |

OTHER PUBLICATIONS

Notification Concerning Transmittal of International Preliminary Report on Patentability with Written Opinion of the International Searching Authority for PCT Application No. PCT/US2011/055166, filed Oct. 6, 2011, mailing date of Apr. 18, 2013, The International Bureau of WIPO, Geneva, Switzerland.

Notification of Transmittal of the International Search Report and the Written Opinion of the International Searching Authority for PCT Application No. PCT/US2013/028990, filed Mar. 5, 2013; mailing date of Jun. 4, 2013; Korean Intellectual Property Office, Republic of Korea.

* cited by examiner

SOLID FUEL SKEWER SUSPENSION BURNING SYSTEM

CROSS-REFERENCE TO RELATED APPLICATIONS

This application is a bypass continuation of International Application No. PCT/US2011/055166, filed Oct. 6, 2011, entitled "SOLID FUEL SKEWER SUSPENSION BURNING SYSTEM", which claims the benefit of U.S. Provisional Patent Application Ser. No. 61/390,822, filed Oct. 7, 2010, entitled "WASTE DERIVED SOLID FUEL SKEWER FOR A FUEL SYSTEM OF A KILN", and U.S. Provisional Patent Application Ser. No. 61/472,802, filed Apr. 7, 2011, entitled "SOLID FUEL SKEWER SUSPENSION BURNING SYSTEM", all of the above disclosures of which are hereby incorporated by reference.

BACKGROUND

Various aspects of the present invention relate generally to fuel delivery systems for a kiln such as a cement kiln or lime kiln, and more particularly, to a skewer for the handling of whole tires in the fuel system of a kiln.

Cement is a fine-powdered binding substance that sets when mixed with water to bind sand, gravel and other components into concrete. In general, cement is comprised of two components, including clinker and gypsum. Clinker is produced in a cement kiln by heating raw materials including calcium, silica, alumina, iron and small amounts of various admixtures to a sintering temperature. The resulting clinker exits the kiln in small, irregularly shaped clumps. Gypsum is mixed with the clinker to serve as a setting additive and to facilitate grinding of the clinker into the powdered form of cement.

Several different production processes are known for manufacturing clinker in cement kilns. For instance, cement kilns may be "long dry" or "long wet". In both cases, the raw materials required to manufacture clinker are crushed and mixed together. In a wet process, the raw material is further mixed with water into a slurry. In each process, the raw material is fed into a long rotary kiln. As the kiln rotates, the raw material is passed from one end of the kiln to the other. The temperature inside the kiln causes the material to undergo chemical changes including calcining and eventually sintering into irregularly shaped clumps. The clumps of clinker are cooled and are ground up in subsequent processes. For instance, the ground up clinker is mixed with gypsum to produce cement, as noted above.

The heating of the kiln contributes to a significant portion of the energy required to operate a cement kiln. As such, the production processing of modern kilns has been modified from conventional long wet and long dry kilns to improve energy efficiency by using a preheater to preheat the raw material before introducing the raw material into the rotary kiln. In early preheater technologies, a riser duct having one or more cyclones feeds the entrance of the rotary portion of the kiln. Essentially, the raw material falling through the preheater to the rotary kiln is heated by the exhaust gas that normally escape from the kiln. An extension of the preheater is the precalciner kiln. In this kiln technology, the preheater efficiency is improved by installing a second heat source in the riser duct.

BRIEF SUMMARY

According to aspects of the present invention, a solid fuel delivery system that delivers solid fuel into a stationary heat transfer station of a kiln comprises a skewer rod and a fuel advancing system. The skewer rod has a first end and a length such that when the solid fuel delivery system is installed on the stationary heat transfer station of the kiln, the first end of the skewer rod is positioned outside the stationary heat transfer station and the length extends into the stationary heat transfer station. The stationary heat transfer station may comprise for instance, a riser duct, a down draft calciner, a precalciner or a tertiary duct.

In this regard, the skewer rod is utilized to suspend solid fuels in a heated gas stream flowing through the stationary heat transfer station of the kiln. The fuel advancing system has a ram that that advances solid fuel along the length of the skewer rod, e.g., the ram may reciprocate substantially longitudinally in cooperation with the skewer rod or otherwise advance the solid fuel along the skewer rod. As such, the solid fuel transitions into the heated gas stream flowing through the stationary heat transfer station of the kiln. The skewer rod restrains the solid fuel from detaching therefrom in response to force on the solid fuel generated by the heated gas stream. As such, the solid fuel is incinerated, e.g., combusted or gasified, on the skewer rod.

According to further aspects of the present invention, the solid fuel comprises tires. In this regard, tires are skewered onto the skewer rod. That is, the tires are inserted on the skewer rod such that the skewer rod passes through the center hole in each tire. According to still further aspects of the present invention, a loading mechanism automatically loads tires onto the first end of the skewer rod such that once loaded, the fuel advancing system can advance the tires along the length of the skewer rod. The loading mechanism comprises for instance, at least one airlock that serves as a staging area for transitioning tires from a conveyor to the skewer rod.

According to further aspects of the present invention, a method of delivering solid fuel into a stationary heat transfer station of a kiln, comprises implementing an automated cycle and controlling the automated cycle to cycle a programmed amount of tires onto the skewer arm at a set rate. The automatic cycle is implemented by automatically loading solid fuel onto a skewer rod having a first end and a length by skewering the solid fuel onto the first end of the skewer rod and advancing the solid fuel along the skewer rod into a stationary heat transfer station of the kiln. The skewer rod suspends the loaded solid fuels in a heated gas stream flowing through the stationary heat transfer station and the skewer rod restrains the solid fuel from detaching therefrom in response to force on the solid fuel generated by the heated gas stream. According to further aspects of the present invention, skewering the solid fuel onto the first end of the skewer rod comprises automatically loading tires onto the skewer rod by inserting the tires on the skewer rod such that the skewer rod passes through the center hole in each tire.

DETAILED DESCRIPTION

In typical cement and lime kilns, working temperatures typically exceed the temperature utilized by conventional incinerators. Moreover, cement and lime kilns have a high degree of air pollution controls already in place. Still further, limestone, a main ingredient of such kilns, can neutralize acids. As such, cement kilns and lime kilns are an excellent source for disposing of solid waste by burning the solid waste for fuel. Old tires have more energy per pound than coal, thus making tires an excellent fuel for kilns. For example an old tire can generate 15,000 BTU per pound of energy, whereas coal may only generate 12,000 to 13,000 BTU per pound.

Various aspects of present invention relate to suspension burning systems that provide the ability to convert waste derived solid fuels such as old tires into energy as part of the heating system of kilns such as cement kilns and lime kilns. In this regard, skewer arrangements are provided that enable the complete incineration of whole tires while in suspension. Moreover, the skewer arrangements herein positively maintain the whole tires in suspension without allowing the tires to unintentionally fall into the kiln and are thus suitable for use in locations that exhibit a high heated gas velocity, as will be described herein.

Preheater and Precalciner Kilns

Figure 1:
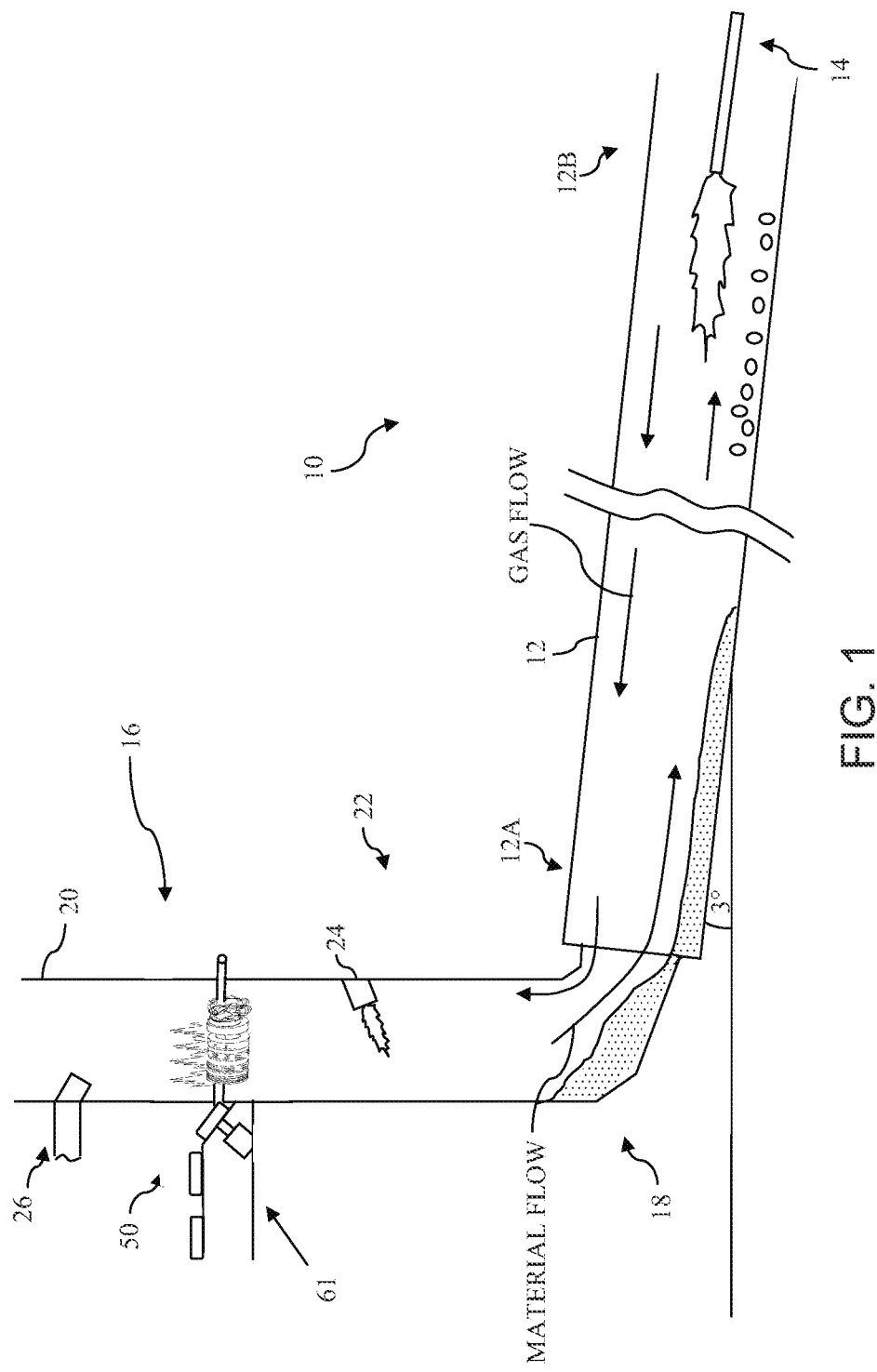
FIG. 1 is a basic diagram of a kiln with a preheater having a solid fuel delivery system, according to various aspects of the present invention.

Referring now to the drawings, and in particular to FIG. 1, a kiln 10 such as a cement kiln or lime kiln comprises in general, a rotating kiln vessel 12. The kiln vessel 12 is typically on the order of 10-18 feet (approximately 3.0-5.5 meters) in diameter, and can extend 400 feet (approximately 122 meters) in length or longer. The kiln vessel 12 includes an infeed end 12A for receiving raw materials and a collection end 12B where the processed material exits the kiln vessel 12. The kiln vessel 12 is slightly angled, e.g., at approximately 3 degrees relative to the horizontal with the infeed end 12A being relatively higher than the collection end 12B to allow the material to move from the infeed end 12A towards the collection end 12B. The kiln vessel 12 typically rotates at approximately 1 to 3 revolutions per minute.

A burner system 14 is positioned towards the collection end 12B of the kiln vessel 12. The burner system 14 burns fuel such as gas, fuel oil, coal or other fuel sources to produce a temperature necessary to convert the mixture of raw materials fed into the vessel 12, into the desired product. The burner system 14 may also include a fan (not shown), which is utilized to induce a draft through the kiln vessel 12. In general, the burner flame heats gas which flows through the kiln vessel 12 in a direction towards the infeed end 12A of the kiln vessel 12.

For example, in a cement kiln, the burner system 14 heats the raw materials to temperatures on the order of approximately 2,300-3,500 degrees Fahrenheit (1,260-1,927 degrees Celsius). As noted above, kiln gases flow in a current towards the infeed end 12A of the vessel 12. In this regard, the materials move counter current to the heated kiln gasses. Through this process, the raw materials are calcined and sintered into clinker. The clinker falls out of the kiln vessel 12 at the collection end 12B and outside ambient air cools the clinker.

Modern kilns 10 may utilize various processes to preheat the material before the material reaches the infeed end 12A of the kiln vessel 12. Preheating the material improves the efficiency of operation, thus reducing overall energy consumption of the kiln 10. For instance, as illustrated, the infeed end 12A of the kiln vessel 12 is coupled to a stationary heat transfer station 16. The stationary heat transfer station 16 is illustrated by a transition 18 to a riser duct 20, which extends vertically on the order of 300-400 feet (91-122 meters). Essentially, the raw material is poured in through the riser duct 20, and falls through one or more cyclones (not shown) towards the infeed end 12A of the kiln vessel 12. Correspondingly, the heated kiln gas flows out of the kiln vessel 12 through the infeed end 12A, through the transition 18 and up the riser duct 20. The raw material thus introduced into the infeed end of the kiln vessel 12 is preheated and/or at least partially precalcined before entering the kiln vessel 12.

It is also possible to add a secondary burner system 22 in the stationary heat transfer station 16. The inclusion of a secondary burner system 22 adds to the heat capability of the stationary heat transfer station 16. This arrangement is generally referred to as a precalciner kiln. In this regard, the secondary burner system 22 is implemented in the riser duct 20 by a burner inlet 24. Supplying too much oxygen for the burner in the riser duct 20 through the kiln vessel 12 can cool the material sintering in the kiln. As such, a bypass/tertiary air duct is provided to run spent air from the cooler of the kiln, bypassing the rotating kiln vessel 12 to the riser duct 20 to a supplemental gas inlet 26.

Down Draft Calciner Kiln

Figure 2:
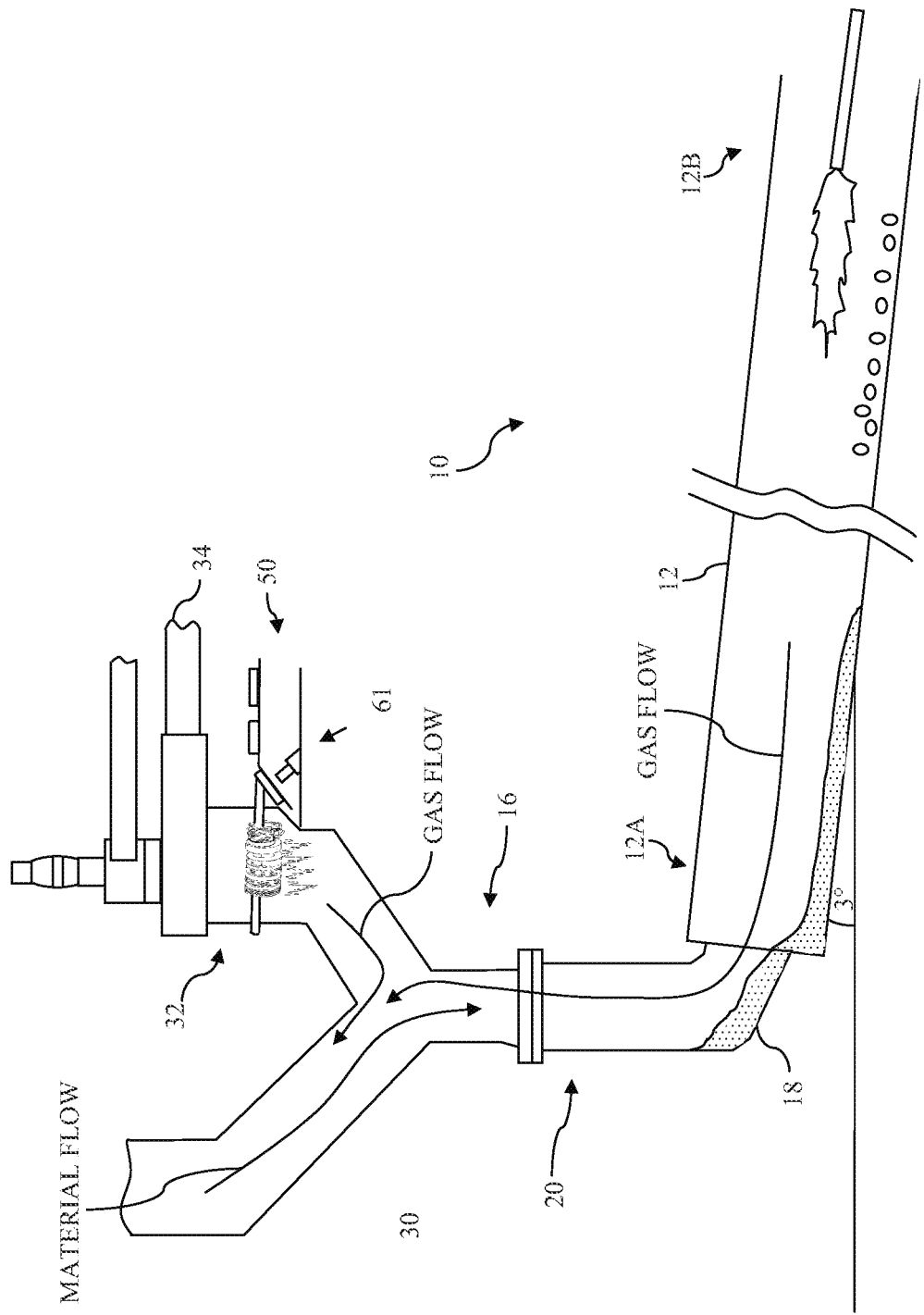
FIG. 2 is a basic diagram of a kiln with a down draft calciner, having a solid fuel delivery system, according to various aspects of the present invention.

Referring to FIG. 2, a kiln 10 is provided that is analogous to the kiln 10 of FIG. 1, except that the stationary heat transfer station 16 comprises a riser duct 20 having a fork 30 and a down draft calciner 32. The down draft calciner 32 has a lower portion 34 that is communicably connected to the fork 30 of the riser duct 20. A tertiary gas duct 34 supplies oxygen to the down draft calciner 32. The down draft calciner 32 includes a burner to create a secondary/supplemental heat source. The down draft carries the heat from the down draft calciner 32 to the fork 30 where the heat combines with the heated gas from the kiln vessel 12 to heat the material falling through the stationary heat transfer station 16 as described more fully herein.

Referring to FIGS. 1 and 2 generally, various aspects of the present invention relate to systems and methods of using a skewer for the controlled burning of waste derived solid fuels, especially whole tires, in such a way that the whole tire is incinerated in suspension regardless of air velocity of the heated kiln gasses passing through the stationary heat transfer station 16.

Skewer Rod Fuel Delivery System

Figure 3:
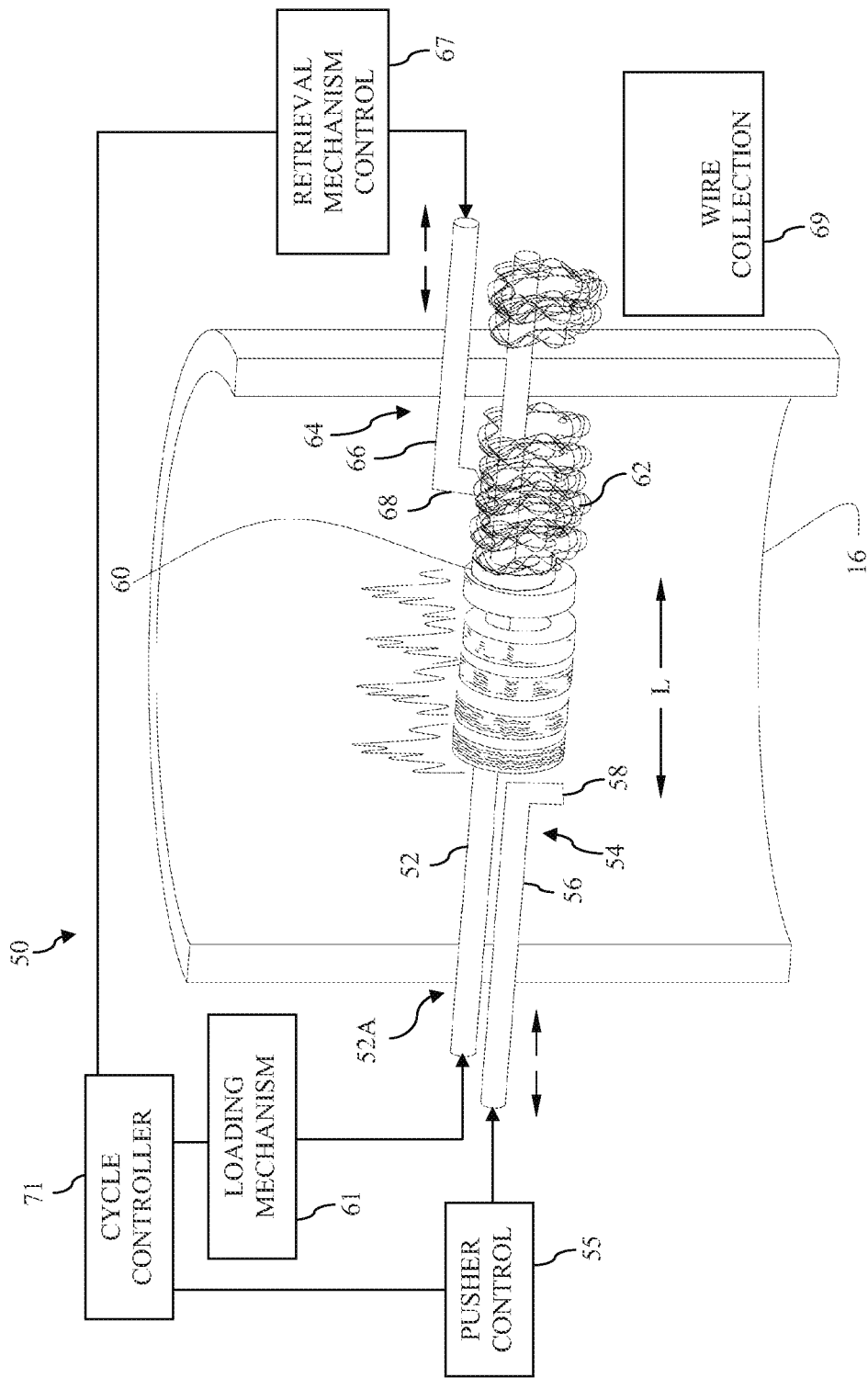
FIG. 3 is a diagram of a solid fuel delivery system having a skewer, according to various aspects of the present invention.

Referring to FIG. 3, a skewer system 50, also referred to herein as a solid fuel delivery system, is illustrated. The skewer system 50 delivers solid fuel into a stationary heat transfer station of a kiln, e.g., in the riser duct 20 in preheater or precalciner kilns, in the calciner of a down draft calciner 32, in the tertiary air duct 26, 34 or other suitable location. However, the skewer system 50 described herein is particularly suited for use in low oxygen, high gas velocity areas, which provides the added benefit of reducing nitrogen oxide (NOx) gasses.

The skewer system 50 comprises a skewer rod 52 that passes through the riser duct 20 (for sake of example) of the stationary heat transfer station. The skewer rod 52 has a first end 52A and a length that extends longitudinally (L). For instance, when the solid fuel delivery system is installed on the stationary heat transfer station of the kiln, the first end of the skewer rod 52 is positioned outside the stationary heat transfer station and the length extends into the stationary heat transfer station. The skewer rod 52 is utilized to suspend solid fuels in a heated gas stream flowing through the stationary heat transfer station of the kiln by skewering the solid fuel, as will be described in greater detail below.

The skewer rod 52 is made from a high temperature alloy that can withstand the temperature within the stationary heat transfer station, e.g., the riser duct 20 in this example. For instance, in various illustrative examples, the skewer rod 52 extends into the stationary heat transfer station at a location where the kiln gas stream is at a temperature of 1600-2000 degrees Fahrenheit (871 to 1093 degrees Celsius). Moreover, the illustrated skewer rod 52 is implemented as a device such as a pole. However, the skewer rod 52 may alternatively comprise a worm drive, auger or other configuration necessary to load and move solid fuels such as tires into and through the heated gas of the riser duct 20. Moreover, the skewer rod 52 can optionally rotate, reciprocate, pivot or otherwise move through one or more positions during suspension burning operations, examples of which are set out in greater detail herein. The overall length of the skewer rod 52 will depend upon the location in which the skewer system 50 is installed. For instance, a riser duct 20 may be approximately 10-12 feet (3-3.7 meters) in diameter (riser ducts can be and usually are square) and includes a circular riser duct wall made of steel and refractory material.

A fuel advancing system, illustrated as a solid fuel pusher 54, has a pusher arm 56 that is capable of reciprocating substantially longitudinally in cooperation with the skewer rod 52. The pusher arm 56 also comprises a ram 58 about an end of the pusher arm 56. As such, the ram 58 reciprocates substantially longitudinally in cooperation with the skewer rod 52 to advance solid fuel, which has been previously inserted onto the skewer rod 52, along the length of the skewer rod 52 and into the heated gas stream flowing through the stationary heat transfer station of the kiln. The pusher 54 is controlled, e.g., by a pusher control 55 such as an actuator, motor or other suitable automated source, to push solid fuel, e.g., whole tires, along the skewer rod 52 in a direction from the first end 52A along the length of the skewer rod 52 to position the tires for incineration as fuel. As an alternative, the ram can pull the solid fuel along the skewer rod 52.

In an illustrative example, the waste derived solid fuel comprises whole tires 60. In this regard, each whole tire 60 is skewered onto the skewer rod 52. Each tire is skewered onto the skewer rod 52 by a loading mechanism 61, examples of which are set out more fully herein. In general, the loading mechanism 61 automatically loads tires onto the first end of the skewer rod 52 under a process control, for example, which is programmed to burn a desired amount of tires at a set rate as will be described in greater detail herein. When an appropriate number of tires 60 have been loaded onto the skewer rod 52, the ram 58 of the pusher 54 engages an end tire 60 and the pusher 54 is extended to advance the loaded tires 60 out along skewer rod 52 into the heated gas flow.

As noted above, the skewer system 50 described herein is particularly suited for use in low oxygen, high gas velocity areas. In this regard, the skewer rod 52 restrains the solid fuel, e.g., tires, from detaching therefrom, in response to force on the solid fuel generated by the heated gas stream. For instance, the skewer rod 52 passes through the hole in the tires such that the rim flange, liner, body plies, carcass, edge cover, belts, cap plies, undertread, or other parts of the tire prevent the tire from detaching from the skewer rod 52 as the tires are incinerated, e.g., combusted or gasified.

Wire Handling

The incinerated tires 60 may possibly leave behind tire wire 62, e.g., steel belt formed inside the tire. Since the tires 60 have been skewered onto the skewer rod 52, any wire 62 will be held onto the skewer rod 52 after all of the rubber has been incinerated. According to aspects of the present invention, the skewer rod 52 provides at least three opportunities to deal with the wire 62 in conventional tires 60. The wire 62 can be taken completely out of the cement process, thus enabling the wire 62 to be recycled. The wire 62 can be allowed to drop into the kiln vessel 12 as a raw material. The wire 62 can accumulate and remain in the heated gas stream long enough to burn completely off.

According to various aspects of the present invention, the remnant wire 62 can be collected, e.g., for recycling. Under this arrangement, the skewer system 50 further comprises a retrieval mechanism 64, e.g., implemented as a wire retriever in this illustrative example. The retrieval mechanism 64 has a retrieval arm 66 that is capable of reciprocating substantially longitudinally in cooperation with the skewer rod 52, e.g., by a retrieval mechanism control 67 such as an actuator, motor or other suitable automated source. The retrieval mechanism 64 also includes a member 68 such as a scraper about a first end of the retrieval arm 66 that is configured to pull solid fuel remnants such as wire 62 off of the skewer rod 52. Under this configuration, the wire remnants 62 is collected. For instance, as illustrated, the wire remnants 62 are collected into a wire collection apparatus 69 that is staged within a staging area of the stationary heat transfer station 16. As an alternative example, the wire 62 can be physically removed from the stationary heat transfer station 16. For instance, the wire 62 can be scrapped off the skewer rod 52 through a port in the sidewall of the stationary heat transfer station 16 (not shown).

As illustrated, the retrieval member 64 is configured to remove wire 62 remaining from incinerated material of whole tires off the skewer rod 52 from a side opposite the solid fuel entrance end of the skewer rod 52. However, in practice, other arrangements may be implemented. For instance, in an exemplary implementation, the ram 58 of the pusher 54 replaces the retrieval member, e.g., by extending out into the heated gas flow so as to retrieve the wire 62 from the stationary heat transfer station 16.

Alternatively, it may be desirable to allow the wire to fall into the kiln vessel 12, e.g., where it is desirable to convert the wire 62 into a raw material of the cement mixture. In cement clinker manufacturing, approximately 2% of the ingredient is iron which is used as the flux. The tire wire 62 can provide a source for that required iron. As such, the steel belts in tires can be melted so as to become part of the cement clinker formula. Therefore, a cement factory can adjust their iron mixture if burning old tires. If the cement factory recovers the tire wire 62 into the kiln vessel 12, the kiln operation should control the amount of tire burning so as to regulate the mixture of iron into the raw material as tire burning affects the iron content in the material.

The wire 62 is heated and thus soft. As such, in exemplary implementations, the retrieval member 50 implements a cutter having a cutting arm that extends along the skewer rod 52 generally opposite the fuel advancing system, to cut wire remaining from incinerated whole tires off the skewer rod 52. For instance, the member 68 is implemented as a cutter, e.g., a suitable blade or other cutting instrument, that can cut the wire 62 so that the cut wire 62 falls off of the skewer rod 52 and is free to fall into the kiln vessel 12.

Operation

In an illustrative operation, a cycle controller 71 controls operation of the loading mechanism and fuel advancing system to cycle a programmed amount of tires at a set rate. For instance, the cycle controller 71 can control the loading mechanism 61 to load tire(s) onto the skewer rod 52. The wall of the stationary heat transfer station 16 can include a port or other opening that exposes the end of the skewer rod 52 such that tires 60 can be loaded thereon by the loading mechanism 61. In this regard, the illustrated skewer rod 52 passes through two opposite walls of the riser duct 20. As such, the skewer rod 52 can be held at the end opposite of the end the tires are loaded on. Depending upon the location of the skewer rod 52, it may be necessary to load the tires through an air lock, as will be described in greater detail herein.

One or more tires are staged on the end of the skewer rod 52 by loading the tires such that the skewer rod 52 passes through the hole in the center of each loaded tire. The cycle controller 71 then controls operation of the fuel advancing system, e.g., to cause the ram 58 of the pusher arm 56 to push the tires into the stationary heat transfer station 16, e.g., by controlling the pusher control 55 mechanically coupled to the pusher 54. For instance, in exemplary implementations, the pusher arm 56 is implemented as a hydraulic ram capable of reciprocating in such a way as to push the tires 60 into the hot air stream, and then retract back until the next cycle.

Within one to two minutes, the tires are typically incinerated. At this point, the retrieval mechanism 64 can extend out and salvage the remnant wire 62 hanging on the skewer rod 52. Alternatively, in exemplary implementations, the retrieval mechanism 64 extends out to cut the wire 62 so that the wire falls into the kiln vessel 12. Still alternatively, the wire retrieval or cutting process need not occur such that the wire 62 burns out. Still further, wire retrieval can occur periodically. For instance, in exemplary implementations, the wire retrieval/cutting occurs every nth cycle, where n is any integer. Still further, in exemplary implementations, wire collection and/or retrieval occurs as needed, e.g., when a sensor, detector or other mechanism indicates that there is a buildup of wire 62 on the skewer rod 52.

Maximizing Tire Fuel by Preventing Excessive Sulfur Buildup

In precalciner kilns, there is a low amount of oxygen (for example, approximately 2%) from near the kiln inlet to just below the tertiary air inlet. If an un-combusted tire or portion of un-combusted tire were to contact the process material of the kiln, localized reducing conditions could occur that cause a release of sulfur from the process material of the kiln. Localized reduction is believed to involve a decrease in oxygen due to volatiles depleting the gas stream of its oxygen, thus leaving reduced (or no) oxygen for the slower burning fixed fuel carbon. The fixed fuel carbon needs oxygen for combustion and thus finds oxygen in raw material sulfur, thus further contributing to sulfur buildup.

As such, if tires were to fall from suspension into the kiln process materials, the combustible material of the tire is believed to seek oxygen for combusting from the process materials within the kiln. When the fallen tire obtains this oxygen from the process material, sulfur from the process material is released. This sulfur travels with the kiln gasses up the riser duct where it cools and condenses on internal surfaces of the stationary transfer station. More particularly, in a kiln, it is possible for volatilized sulfur to be recovered as calcium sulfate, which condenses and adheres to the stationary transfer station, e.g., along the walls of the riser duct and upper vessels and chutes, within cyclones, etc. This continuous coagulation of calcium sulfate eventually builds up and can cause components to plug up. This build up can also lead to gas flow restrictions. As a result, it is possible that the kiln may need to be shut down so that it can be cleaned, potentially requiring jackhammers to remove the buildup.

However, as noted in greater detail herein, the skewer rod 52 suspends the combustible material of the tire or other solid fuel by skewering the solid fuel throughout the entire combustible stage. Because each tire 60 is skewered by the skewer rod 52, the tires 60 remain suspended within the heated gas flow and do not detach from the skewer rod 52, even in response to force on the tires generated by the heated gas stream. That is, the whole tires 60 are incapable of detaching, falling or otherwise transitioning off of the skewer rod 52 as the tires are incinerated. Due to the immense heat in the stationary heat transfer station 16, the tires 60 will eventually incinerate, typically within one to two minutes for typical car tires. Slightly different times may be required depending upon the tire, e.g., semi trailer tires may require more time to incinerate than car tires.

Thus, the combustible material of the tires cannot fall into the rotating kiln vessel and mix with the process material. As a result, localized reducing conditions are avoided or at least reduced, and therefore excessive sulfur/calcium sulfate buildup is avoided as well. Various aspects of the present invention thus enable precalciner kilns to utilize greater quantities of whole tire fuel in the location of near the inlet of the kiln. As such, tire burning, which can typically account for only 2% to 5% of the fuel used by the kiln in a precalciner kiln, can account for a significantly higher percentage of consumed fuel by the kiln 10 when a skewer system is utilized to suspend whole tires as described more fully herein.

Nitrogen Oxide Reduction

Nitrogen oxide (NOx) is a byproduct produced in cement kilns. The reduction of NOx emissions of cement kilns is a constant challenge. One way to reduce nitrogen oxide is to put the secondary burner system 22 in the lower oxygen environment. For example, the skewer system 50 can be positioned between the tertiary air duct 26, 34 and the secondary burner system 22 within the riser duct 20. Therefore raw material at the top of the riser duct 20 falls past the tertiary duct 26, 34, then falls past the suspension burning skewer system 50 then passes the secondary burner system 22 before entering the kiln vessel 12.

This environment may be unsuitable for rack style suspension burners. For instance, the gas velocity in this region is fast, on the order of 20 to 30 meters per second (m/s) which may be too fast to allow a tire and or tire portion to incinerate completely before reaching the kiln vessel 12. Thus, the upward heated gas velocity may be sufficient to lift tires off of a rack so that the tire or portions thereof, fall into the kiln vessel 12. However, according to aspects of the present invention, the skewer rod 52 maintains the tires in suspension until the combustible aspects are completely burned off, despite the strong force caused by the gas velocity of the heated stream. For instance, according to further aspects of the present invention, tires are skewered onto the skewer rod 52. That is, the tires are inserted on the skewer rod 52 such that the skewer rod 52 passes through the center hole in each tire. As such, the rubber and wire portions of the tires themselves prevent the tires from lifting entirely off and detaching from the skewer rod 52 in response to force on the tires generated by the heated gas stream. As such, the tires are incinerated, e.g., combusted or gasified, on the skewer rod.

In this manner, the skewer rod 52 can hold onto the tire 60 as long as necessary to ensure that the combustible portion of the tire burns off, e.g., 100% in suspension regardless of the velocity of the air stream. By using the skewer rod 52, even in high velocity air environments the tires 60 cannot be detached from the skewer mechanism. Moreover, because the tires 60 can now be incinerated in a relatively low oxygen area of the kiln, NOx emissions of the kiln are reduced while increasing the energy efficiency of the kiln 10.

Cantilevered Skewer

Figure 4:
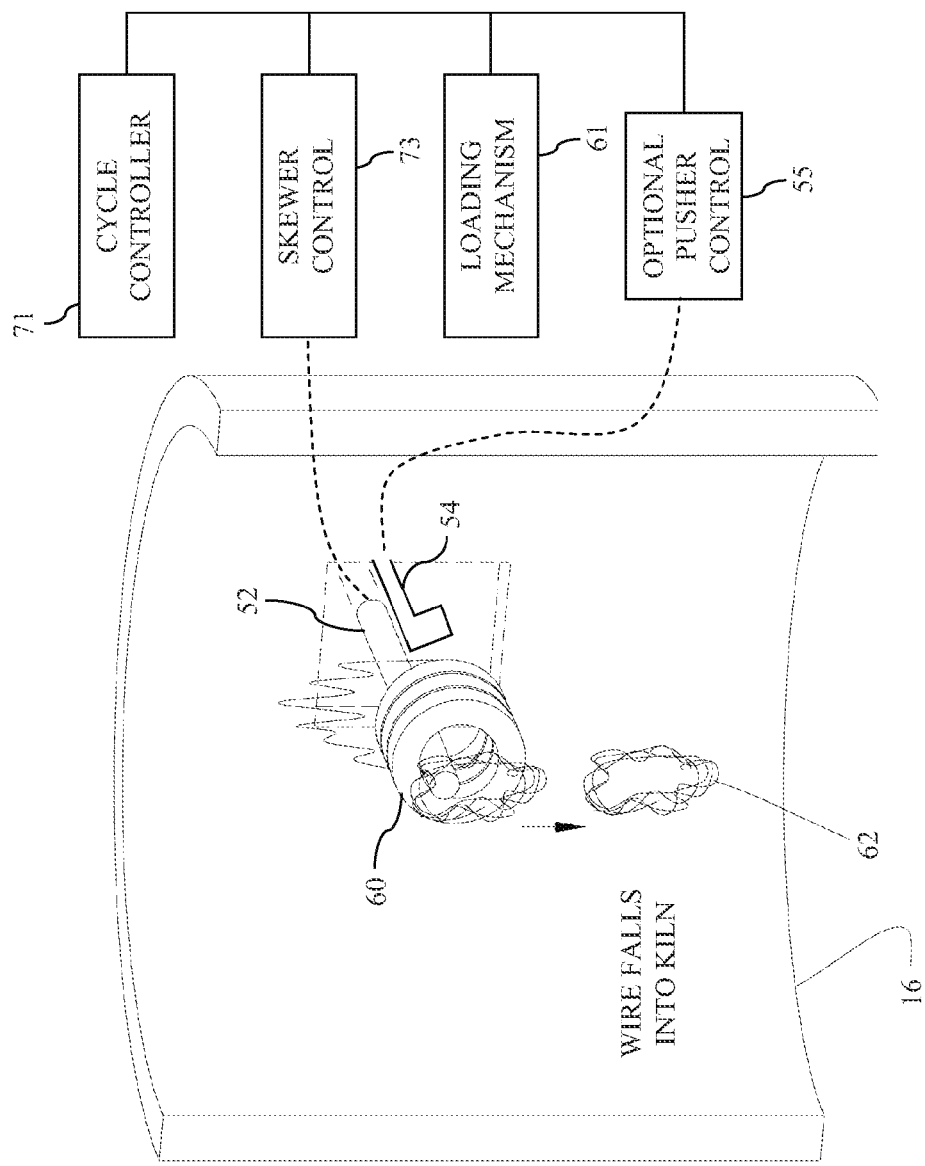
FIG. 4 is a diagram of a solid fuel delivery system having a skewer, according to further aspects of the present invention.

Referring to FIG. 4, a solid fuel delivery system is illustrated according to another aspect of the present invention. The illustrated system is analogous to that described with reference to FIG. 3, except that as illustrated, the skewer rod 52 is implemented as a cantilevered arm. The arm extends from the wall of a stationary heat transfer station 16, e.g., a riser duct, calciner, or other suitable location.

For instance, an illustrative solid fuel delivery system is provided where the skewer rod is cantilevered from the outside of the stationary heat transfer station such that a free end of the skewer rod extends into the stationary heat transfer station. Moreover, the skewer rod is supported towards the first end of the skewer rod such that the skewer rod is supported at the same end upon which tire are inserted onto the skewer rod.

In the illustrated example, the arm passes through a door 70 such as a pressure lock door. According to aspects of the present invention, a fuel advancing system, e.g., a pusher 54, is utilized to push tires 60 into the heated gas stream. In exemplary implementations, the pusher 54 can be further utilized to push the wire 62 off of the cantilevered skewer into the kiln vessel 12. In this illustrative implementation, the skewer arm 52 is held or otherwise supported at the same end upon which tires are loaded. This can be accomplished using multiple points that hold the skewer rod 52 such that each hold point can be sequentially released from engagement with the skewer rod 52 as the solid fuel, e.g., tires, advance along the skewer rod 52. An example of such an arrangement is described in greater detail below.

In an alternative implementation, the system uses a feed mechanism that eliminates the need for a pusher 54 to push the tires out onto the skewer rod 52. For instance, according to aspects of the present invention, the skewer system 50 further comprises a skewer rod reciprocating device (not shown) that is controlled by the controller 71 to cause the cantilevered skewer rod 52 to transition longitudinally backwards for loading of tires onto the skewer rod 52 by the loading mechanism 61, and to transition the skewer rod longitudinally forward for moving the loaded tires into a heated gas stream of the stationary heat transfer station of a kiln.

By way of illustration, the skewer rod 52 is coupled to a skewer control 73, e.g., a motor, sled, actuator or other device that causes the skewer rod 52 to retract, reciprocate, etc. For instance, in an illustrative implementation, the skewer control 73 causes the skewer rod 52 to retract back out of the stationary heat transfer station 16 through the door 70. Once the end of the cantilevered skewer rod is outside the stationary heat transfer station 16, one or more tires 60 are automatically loaded onto the end of the skewer rod. Once tires have been loaded, the door 70 is once again opened and the skewer rod 52 is extended into the heat gas flow within the stationary transfer station.

Bent Rod Cantilevered Skewer

Figure 5:
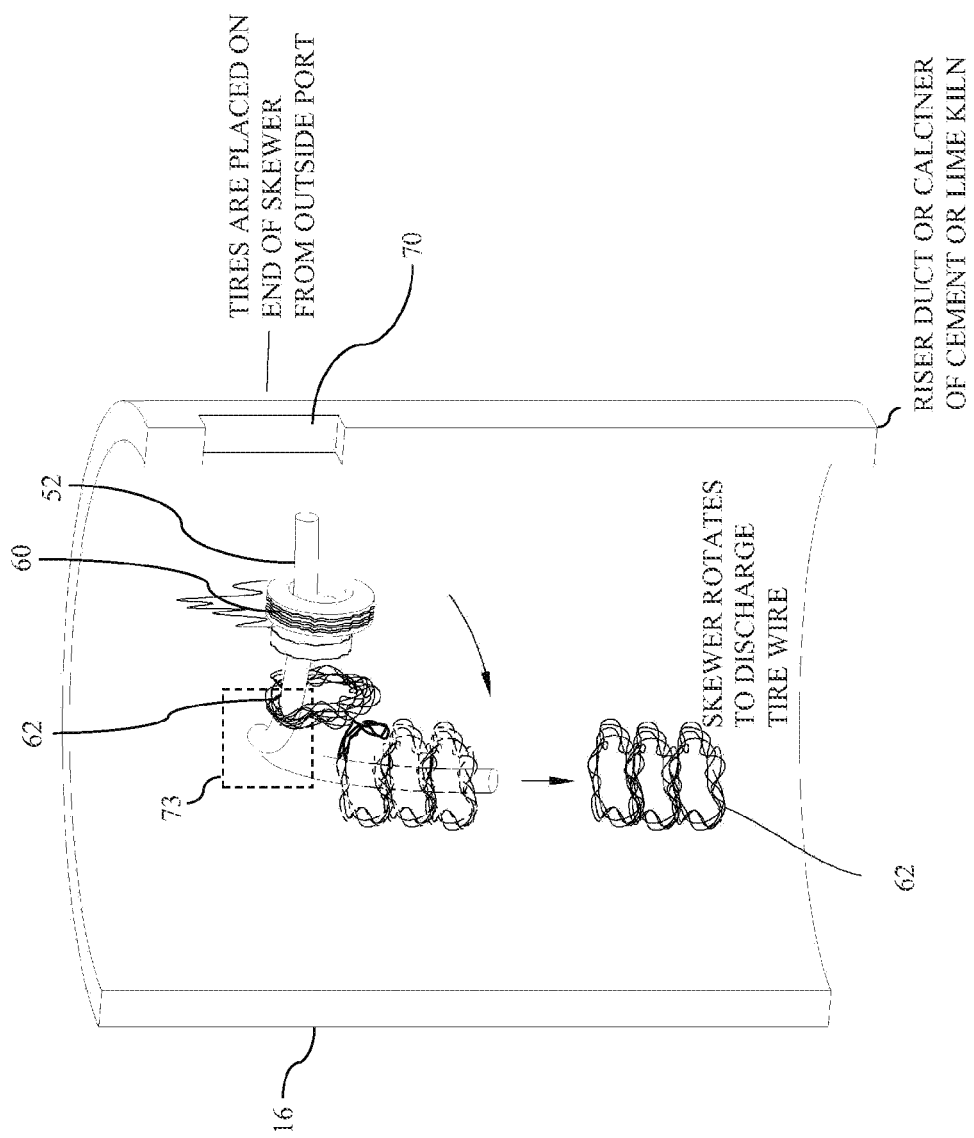
FIG. 5 is a diagram of a solid fuel delivery system having a skewer that transitions between a first position and a second position, according to yet further aspects of the present invention.

Referring to FIG. 5, a solid fuel delivery system is illustrated according to another aspect of the present invention. The illustrated system is analogous to that described with reference to FIGS. 3 and 4, except that as illustrated, the skewer rod 52 has at least one bend therein so that the entire length of the skewer rod 52 is not straight. In this exemplary implementation, the skewer rod 52 is also referred to herein as a skewer arm having a shoulder therein.

The illustrated skewer rod 52 comprises a tire loading end, a fixed end, and a length for holding tires. The fixed end is held so as to be rotatable/pivot-able, e.g., in a generally vertical plane. For instance, a skewer rod positioning mechanism is coupled to the fixed end of the skewer rod 52 to selectively rotate the skewer rod. A loading mechanism automatically load tires onto the tire loading end of the skewer rod and a controller controls the loading mechanism and the rotation of the skewer rod to cycle a programmed amount of tires at a set rate.

For instance, as illustrated, the skewer rod 52 is implemented as a curved arm that is fixed at one point so as to be pivot-able within the stationary heat transfer station 16. The skewer rod 52 is oriented so that one portion of the arm extends horizontally out of the riser duct 20 (or other location in the stationary heat transfer station), e.g., through the door 70. In this regard, a ram of a loading mechanism 61 (not shown) can push the tires onto the skewer rod 52 and into the heated gas flow. Alternatively, the bent/curved portion of the skewer rod 52 is controlled to rotate so as to allow the tires to gravity feed down onto the bent portion of the skewer rod 52. As illustrated, the outside wall includes a door or port 70 which is opened to load tires onto the cantilevered end of the curved skewer rod by a corresponding loading mechanism 61. As illustrated, the skewer rod 52 is rotated to a first position suitable for loading tires 60 through the port 70 and/or for incinerating tires 60.

When the tires loaded onto the skewer rod 52 have been incinerated, the skewer rod 52 is rotated to a second rotated position (illustrated in dashed lines) to discharge the wire 62 into the kiln vessel 12. The skewer rod 52 then rotates back to its first position for reloading through the outside port 70. Thus, in an exemplary implementation, the controller causes the skewer rod positioning mechanism to rotate the skewer rod 52 to a first position for loading of tires, and the controller causes the skewer rod positioning mechanism to rotate the skewer rod 52 to a second position for dumping the remnant wire off of the skewer rod 52, e.g., based upon a pre-programmed cycle and/or based upon feedback from sensors or other suitable input devices. Although illustrated as being curved, the skewer rod 52 can take on alternative configurations, including being curved, having a bend, e.g., two straight sections having a bend forming approximately a right angle, etc As yet a further illustrative example, instead of rotating the skewer rod 52 to discharge the wire 62, the port 70 can be reopened and a retrieval mechanism can be used to scrape the wire 62 off of the skewer rod 52 to prevent the wire 62 from entering the kiln vessel 12. This allows the skewer rod 52 to be stationary. Moreover, the cycle time of the skewer can be adjusted so that the wire burns off in certain implementations.

Skewer Loading

Figure 6:
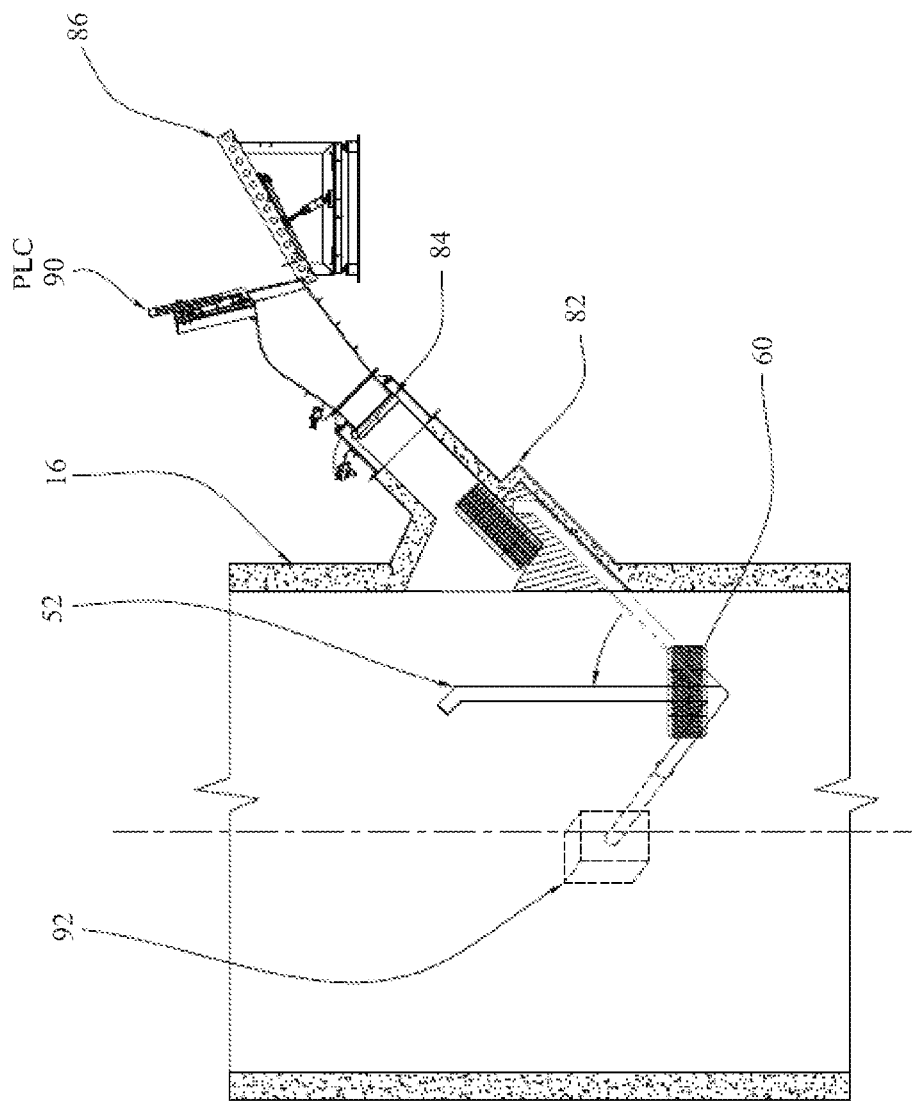
FIG. 6 is a diagram of a solid fuel delivery system illustrating an exemplary skewer loading system, according to further aspects of the present invention.

Referring to FIG. 6, an illustrative example demonstrates a system for loading a tire onto the skewer rod 52 through a port 70. The loading assembly comprises an airlock defining a first pre-incineration staging area 82 which comprises a housing that extends outside of the main wall of the riser duct 20 through a port 70. An optional airlock valve 84 is provided to create a barrier to atmosphere due to the negative pressure, high velocity and high temperature gasses. A second staging area 86 includes a weighing system to control the feed rate of tires through the inlet of the airlock valve 84 and into the pre-incinerator staging area 82. Further, conveyors and other necessary structures including feeders are utilized to deliver tires 60 to the second staging area 86. Controller 90, e.g., a programmable logic controller, control the airlock valve 84, weighing system 88, motor 92 coupled to the skewer rod 52 and other automation to provide fully automated feeding of tires into the riser duct 20 for incineration.

The controller 90 can function as a cycle controller that controls one or more of: the loading mechanism, skewer rod movement control, fuel advancing system control, retrieval mechanism control, etc. In this regard, the controller 90 operates the solid fuel delivery system to cycle a programmed amount of tires at a set rate to achieve a desired burn. The airlock valve 84 defines an exterior gate relative to the port door 70. When the airlock valve 84 is open to pass a tire into the pre-incineration staging are 82, the port door 70 is closed. The airlock valve 84 is closed while the door 70 is opened to collect tires onto the skewer rod 52.

In order to load the skewer rod 52, the skewer is rotated into the port opening, for example under the control of the controller 90 and motor 92. The skewer rod 52 is rotated into a slot position within the pre-incineration staging area 82. Further, a tire 60 is discharged through the airlock valve 84 so as to slide down onto the staging ledge of the pre-incineration staging area, at a position just above the open end of the skewer rod 52. The motor 92 then rotates the skewer rod 52 so as to spear through the opening of the tire 60 allowing the tire 60 to slide onto the skewer rod 52 where it is brought into the heated gas to incinerate the tires 60. In this regard, the skewer rod 52 includes a bend at the tire loading end so as to facilitate skewering the tires 60 and also to prevent wire remnants from falling into the kiln. This process is repeated for each tire 60 to be incinerated. When the tires 60 are fully incinerated, controls 90 control the motor 92 to rotate the skewer rod 52 so as to drop the wire 62 into the kiln vessel 12. The process repeats as necessary.

Skewer Rod that Passes Entirely Through Stationary Heat Transfer Station

Figure 7:
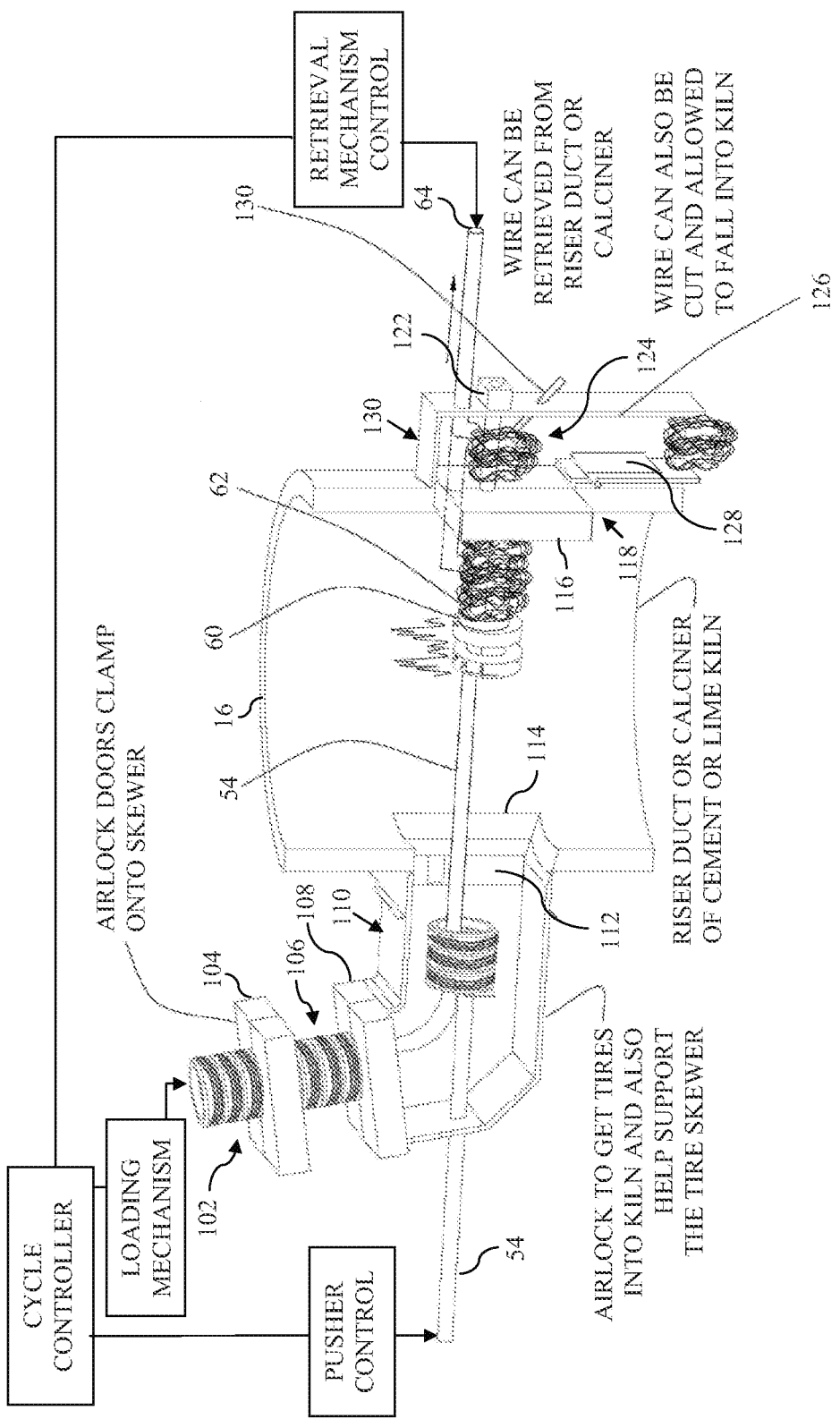
FIG. 7 is a diagram of a solid fuel delivery system, illustrating tires staged in an airlock, tires burned in suspension, and the recovery of wire remnants from tires, according to various aspects of the present invention.

Referring to FIG. 7, a solid fuel delivery system is illustrated according to further aspects of the present invention. As illustrated, the solid fuel delivery system is situated relative to a duct, e.g., a riser duct, a precalciner portion of the riser duct, a down draft calciner, or a tertiary air duct within the stationary heat transfer station. In this illustrative implementation, tires positioned in a loading area 102 transition through a first airlock door 104 into a pre-staging area 106. For instance, tires in the loading area 102 can be weighed or otherwise measured to determine the appropriate number of tires to transition into the pre-staging area 106.

At an appropriate time, e.g., based upon the cycle time of the tire burning operation, the tires in the pre-staging area 106 transition through a second airlock door 108 to an airlock compartment 110. For instance, the tires can transition from the loading area 102 to the pre-staging area 106, and from the pre-staging area 106 to the airlock 110 using gravity feed. As illustrated, the tires are already skewered on the skewer rod 52. When the tires have transitioned into the airlock 110, the pusher 54 extends to abut the end tire.

At a next appropriate time of the tire burning cycle of operation, a third airlock door 112 opens exposing a first port 114 through the wall of the duct. A forth airlock door 116 is positioned opposite of the third airlock door 112 closing a second port 118 through the wall of the riser 20. The second port 118 leads to a wire recovery compartment 120 as will be described in greater detail below.

The skewer rod 52 extends down through the loading area 102, through the pre-staging area 106 and into the airlock 110, where the skewer rod 52 bends and extends through the first port 114 into the duct. The skewer rod 52 further extends through the duct, through the second port 118, into the wire recovery compartment 120. The end of the skewer rod 52 is secured outside of the duct, e.g., by a collar 122 within or outside the wire recovery compartment 120. In this regard, the skewer rod 52 is supported at least in five locations, including the first airlock door 104, the second airlock door 108, the third airlock door 112, the fourth airlock door 116 and the collar 122.

The wire recovery compartment 120 includes a wire cutting area 124, a chute 126 and a chute door 128 between the wire cutting area 124 and the chute 126. The chute door 128 selectively opens to the chute 126 for allowing the wire to be collected, as will be described in greater detail below. The wire cutting area 124 includes a cutter 130 that cuts the remnant wire 62 pulled into the wire recovery compartment 120 by the retrieval mechanism 64. The chute door 128 opens and the wire cut from the skewer rod 52 falls down the chute 126 to a recycle collection area (not shown). The chute 126 is only open when the fourth airlock door 116 is closed. Moreover, the chute 126 is closed when the fourth airlock door 116 is open to create a barrier to atmosphere due to the negative pressure, high velocity and high temperature gasses. Similarly, the third airlock door 114 is closed when the second airlock door 108 is open. Similarly, the third airlock door 114 is open only when the second airlock door 108 is closed, to create a barrier to atmosphere due to the negative pressure, high velocity and high temperature gasses.

While the pusher 54 is pushing tires into the duct through the first port 116, the third airlock door 112 is open. During this time, the remnant wire 62 can be collected by the wire recovery compartment 120. As such, the chute door 128 closes off the chute 126 from the wire cutting area 124, and the first airlock door 104, the second airlock door 108 and the fourth airlock door 116 are closed.

When the pusher arm 54 is in a retracted position, the ram of the pusher arm 54 is disengaged and spaced from tires to facilitate staging the next set of tire(s) to be advanced, along the length of the skewer rod 52 and into the heated gas stream flowing through the stationary heat transfer station of the kiln. During this time, the second airlock door 108 is open allowing a new set of tires to gravity feed into the airlock 110. Because the second airlock door 108 is open, the third airlock door 112 is closed so that the port 114 is closed off. Also, the fourth airlock door 116 can be open allowing the retrieval mechanism to scrape remnant wire 62 across the skewer rod 52 into the wire recovery compartment 120, e.g., if necessary or if desired. Within the wire recovery compartment, the chute door 128 is in a closed position. The wire 62 is cut from the skewer rod 52 by the cutter 130.

Rotary Skewer Rod

Figure 8:
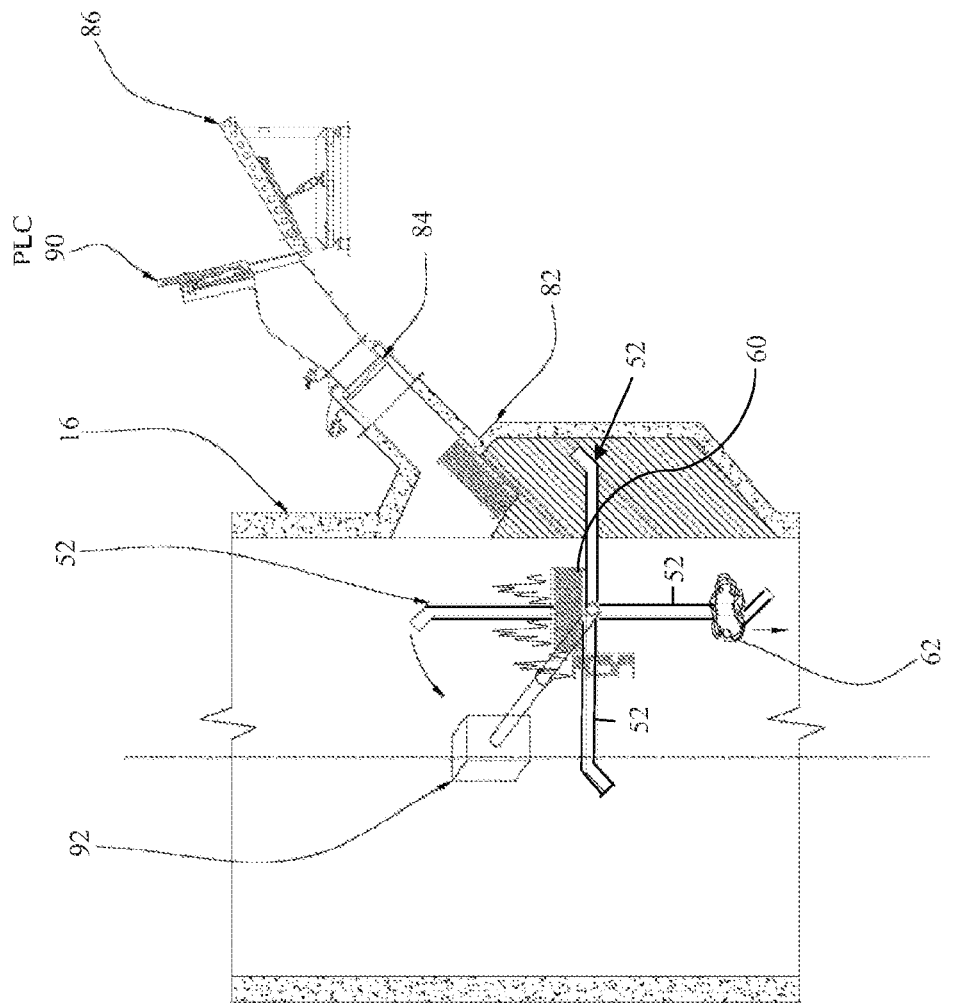
FIG. 8 is a diagram of a solid fuel delivery system wherein the skewer is implemented with a plurality of skewer rods according to various aspects of the present invention.

Referring to FIG. 8, yet another solid fuel delivery system is illustrated, according to further aspects of the present invention. The illustrated solid fuel delivery system is analogous to the solid fuel delivery system illustrated in FIG. 6, except that the skewer includes a plurality of skewer rods 52. There are four skewer rods 52 as illustrated. The skewer rods 52 rotate in a stepped or continuous manner. Moreover, the rate at which the skewer rotates can be varied to accommodate various burn operations. As the skewer rotates, a first skewer rod 52 grabs a tire 60 staged in the airlock 82. As the skewer rotates, the tire is held in suspension until the tire is completely incinerated. As the skewer continues to rotate, the remnant wire 62 will eventually fall off of the skewer rod and drop into the kiln. The rotational speed of the skewer is controlled such that each tire is entirely incinerated before the remnant wire is dropped into the kiln. Moreover, although illustrated as skewering a single tire at a time, various aspects of the present invention are not limited to a single tire. Rather, each skewer rod 52 skewers one or more tires, e.g., depending upon the programmed burn cycle required for a particular application.

Reciprocating Skewer Rod and Feed System

Figure 9:
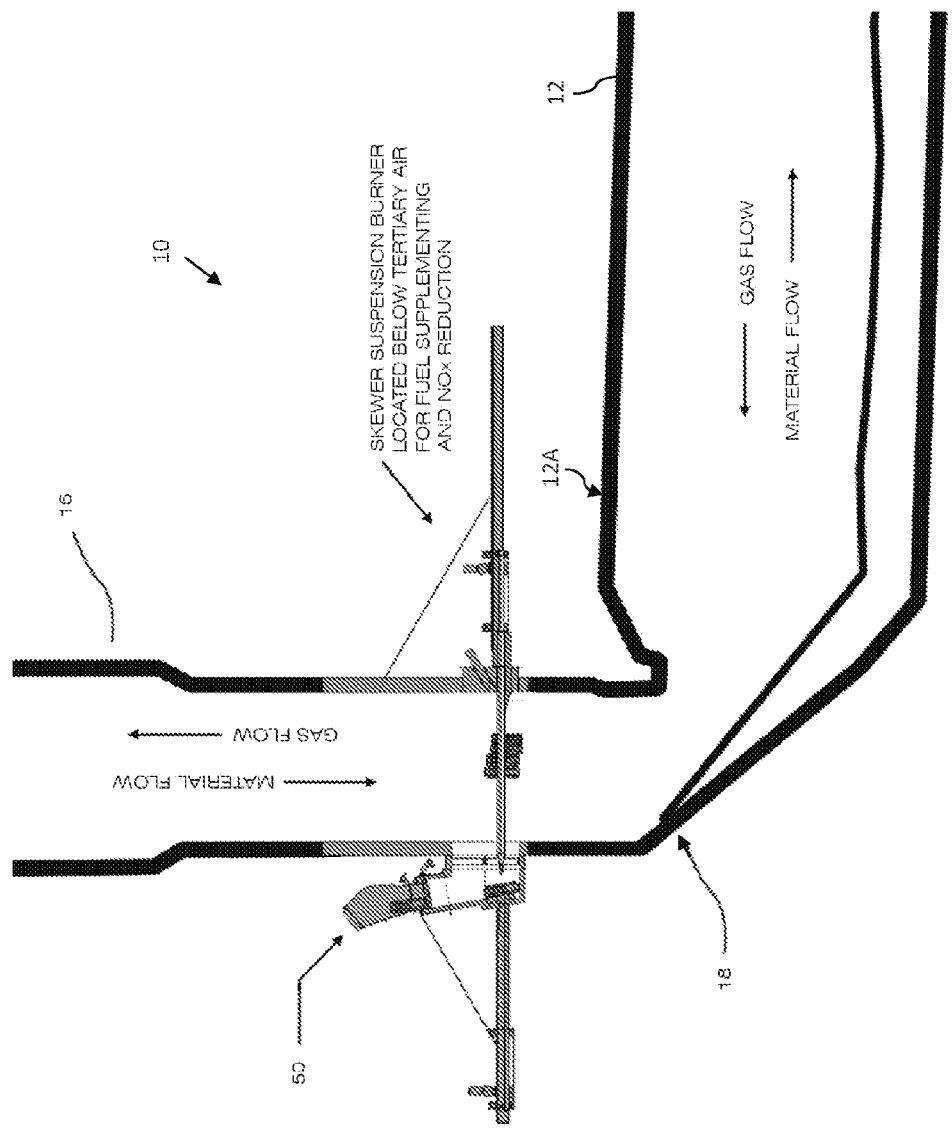
FIG. 9 is a basic diagram of a kiln with a riser duct having a solid fuel delivery system, according to various aspects of the present invention.
Figure 10:
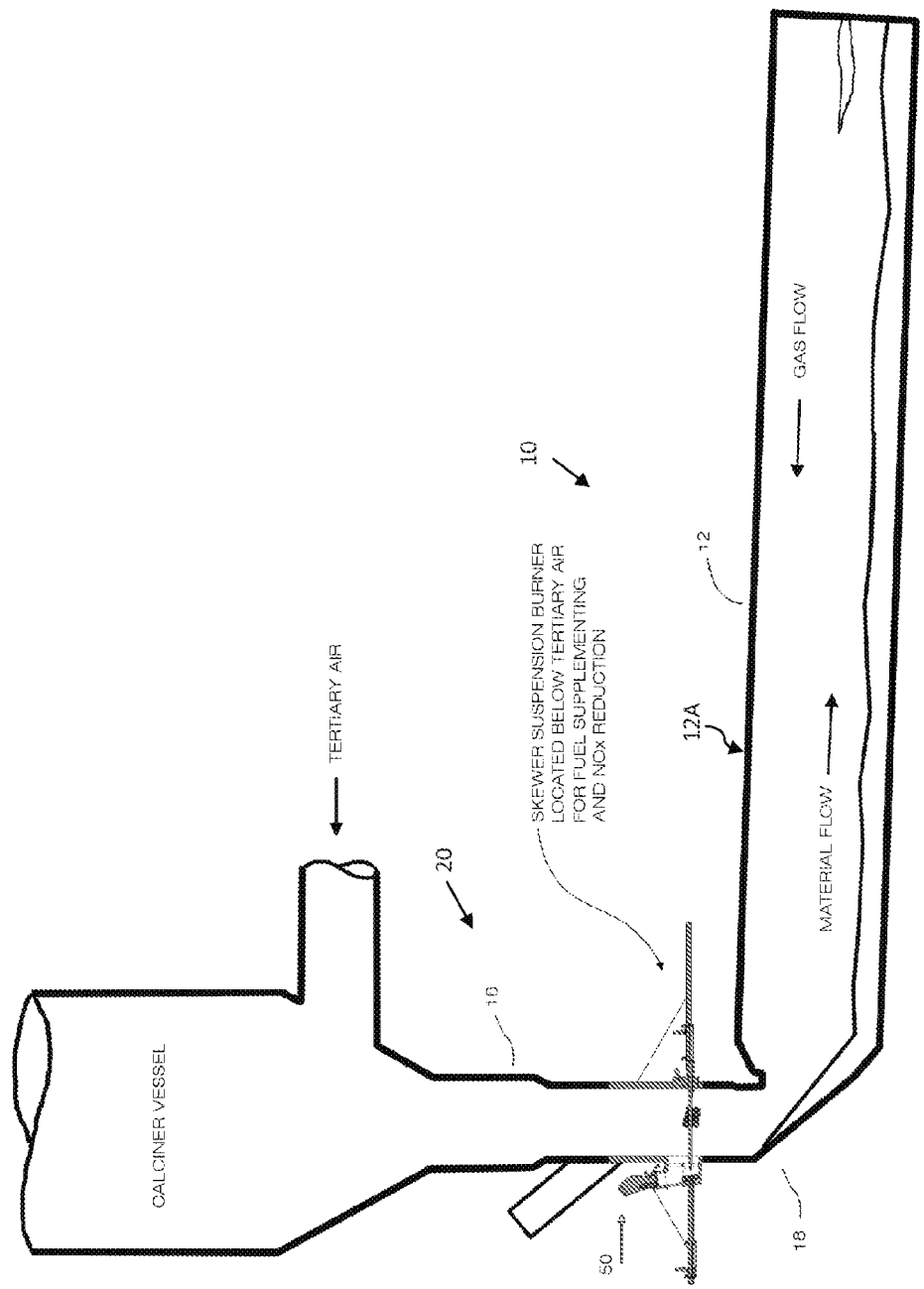
FIG. 10 is a basic diagram of a kiln with a riser duct having a solid fuel delivery system, according to various aspects of the present invention.
Figure 11:
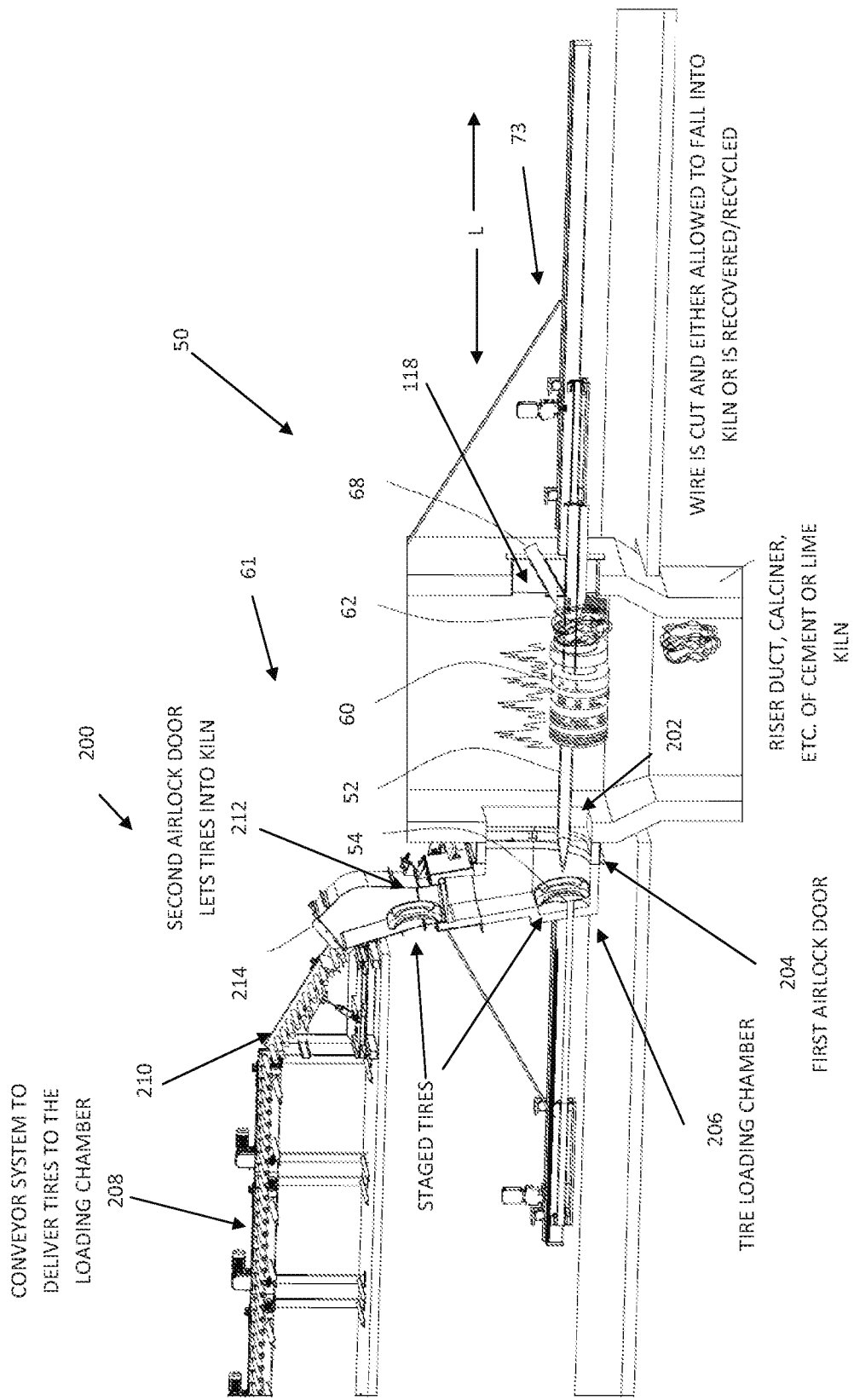
FIG. 11 is a diagram of a solid fuel delivery system suitable for integration with the kiln of FIG. 9 or 10, according to still further aspects of the present invention, illustrated in a first work operative position.

Referring to FIGS. 9, 10 and 11 generally, additional exemplary implementations of the skewer system 50 are illustrated according to further aspects of the present invention. The solid fuel delivery systems in FIGS. 9, 10 and 11 are analogous to and can include any combination of features from those solid fuel delivery systems described more fully herein, and are presented to illustrate positioning of the skewer system 50 in the riser duct 20 of the secondary transfer station 16, in relatively close proximity to the infeed end 12A of the kiln vessel 12. (As noted more fully herein, the skewer system 50 may also be located in the calciner or in a tertiary air duct of other suitable location of the stationary heat transfer station 16).

Referring particularly to FIG. 11, in a manner analogous to that described more fully herein, the skewer system 50, is utilized for the controlled burning of waste derived solid fuels, especially whole tires, in such a way that the whole tire is incinerated in suspension regardless of air velocity of the heated kiln gasses passing through the duct. The skewer system 50 is particularly suited for use in low oxygen, high gas velocity areas, which provides the added benefit of reducing nitrogen oxide (NOx) gasses.

In a manner analogous and interchangeable with other systems described more fully herein, the skewer system 50 comprise a skewer rod 52 that passes through a passage, e.g., riser duct, calciner, etc., where the skewer is installed. The skewer rod 52 has a first end for receiving tires, and a length that extends longitudinally (L) across the opening in the passage. In certain exemplary implementations, the skewer rod 52 is fixed. However, in this exemplary implementation, the skewer rod 52 reciprocates as described more fully herein.

The skewer system 50 includes a skewer control 73 that is used to controllably reciprocate the skewer rod 52. In this illustrative implementation, the skewer control 73 includes a drive device, e.g., a motor, actuator, pneumatic cylinder, hydraulic cylinder or other suitable source to cause the skewer rod 52 to reciprocate back and forth along the longitudinal direction L. In a first illustrative example, the skewer rod 52 operates under program control so as to move a tip of the skewer rod 52 back and forth in cooperation with a loading system 61 to load tires onto the skewer rod 52 according to preprogrammed operation.

In order to facilitate the reciprocating action of the skewer system 50, the riser duct may include a port 118 through which the skewer rod 52 passes. In this regard, the skewer control 73 is located outside of the riser duct. In an exemplary implementation, the port 118 includes a generally open window frame, e.g., big enough to pull the skewer rod 52 through, even if loaded with tires. A skewer door (not shown for purposes of clarity) opens and closes to seal the open window frame of the port 118. The skewer door includes an aperture through the surface of the door that allows the skewer rod 52 to pass from outside the riser duct to inside the riser duct. In this manner, the skewer rod 52 can reciprocate through the aperture, even if the skewer door is closed around the port 118. In an exemplary implementation, the tolerance of the aperture to skewer rod diameter is such that a separate air lock is unnecessary. Alternatively, an air lock may be implemented if required by the particular application.

In exemplary implementations, the skewer rod 52 extends out and reciprocates back by a sufficient amount, e.g., 18 inches (approximately 45.7 cm) per tire, to obtain whole tire fuel for skewered suspension burning. The skewer rod 52 may retract back further, e.g., to facilitate cutting or otherwise removing remnant wire from burned up tires fuel.

The skewer device 73 may also be able to retract the skewer rod 52 entirely out of the riser duct, e.g., for routine inspection, maintenance or other purposes. For instance, in an illustrative example, the tip of the skewer rod 52 can be controlled to retract at least 30 inches (approximately 76.2 cm) past and outside the opening in the riser duct. In this regard, when the skewer rod 52 is fully retracted from the riser duct, a plug can be used to close off the aperture in the door. The plug may be manually inserted in the aperture or the plug may be inserted using an automated process. Moreover, the door can be opened in order to retract the tip of the skewer rod 52 outside of the riser duct, e.g., where the skewer rod 52 becomes unintentionally bent, where excessive buildup of tire wire is left on the skewer rod 52, where a tire has not fully burned off of the skewer rod 52, etc.

In this regard, the cycle control can implement intelligence for smart skewer operation, e.g., to selectively control when the skewer rod 52 reciprocates normally for whole tire suspension burning, when the skewer rod 52 retracts to cut remnant wire from the skewer rod and when the skewer rod 52 retracts entirely outside of the riser duct. The cycle control and implementation of smart skewer operation can be based upon any number of predetermined operating conditions and/or requirements.

Skewer Rod Fuel Delivery System

A loading system 61, further designated by reference to system 200, is provided for feeding tires into the skewer system 50 according to still further aspects of the present invention. In the illustrated example, the delivery of tires is implemented through a dual-air lock system comprising a first airlock door and a second airlock door. More particularly, a window 202 is provided in the passage of the riser duct. A first airlock door 204 opens and closes the window 202 to a tire loading chamber 206. In order to stage one or more tires in the tire loading chamber 206, tires are transported along a conveyor system 208 and are gravity fed down a chute 210 to a second airlock door 212 that opens to the tire loading chamber 206. In this regard, the tires may drop down into a compartment 214 or other structure to be pre-staged at the second air lock door 212.

As shown generally to the left of the passage through the riser duct, the tip of the first end of the skewer rod 52 is extended to a first position. In general, the skewer control 73 has transitioned the skewer rod 52 such that the tip of the skewer rod enters the passage in the riser duct, passes through a window 202 in the passage, through a first airlock door 204, and into a tire loading chamber 206, e.g., a bay or other suitable area for receiving/reloading tires onto the skewer rod 52. Once one or more tires are loaded, the skewer rod 52 retracts back towards the window to draw the tires into the passage for suspension burning of the loaded tires.

A solid fuel pusher 54 has a pusher that reciprocates substantially longitudinally in cooperation with the skewer rod 52 in a manner analogous to that described more fully herein. The pusher 54 also comprises a ram about an end of the pusher arm. The pusher 54 is controlled, e.g., by a pusher control such as an actuator, motor, pneumatic cylinder, hydraulic cylinder or other suitable automated source, to push solid fuel, e.g., whole tires, along the skewer rod 52 in a direction from the first end or tip of the skewer rod 52 along the length of the skewer rod 52 to position the tires for incineration within the passage of the riser duct as fuel.

In an illustrative example, the waste derived solid fuel comprises whole tires 60. In this regard, each whole tire 60 is slipped onto the skewer rod 52 by a loading mechanism 61. In general, the loading mechanism 61 automatically loads tires onto the first end of the skewer rod 52 under a process control, e.g., that is programmed to burn a desired amount of tires at a set rate as described in greater detail herein.

For instance, a tire 60 is staged in the tire loading chamber 206. During a loading operation, the skewer rod 52 extends into the tire loading chamber 206 to receive the staged tire. In practice, the tire loading chamber 206 may alternatively stage more than one tire. The ram of the fuel advancing system, e.g., pusher 54, engages an end tire and the pusher 54 is extended to push the loaded tires 60 out along skewer rod 52 into the heated gas flow. In this regard, the pusher 54 can be configured to slide, move or otherwise adjust the positioning of the existing tires on the skewer rod, e.g., to slide wire closer to a cutter for wire removal, examples of which are described more fully herein.

Wire Handling

As noted above, the incinerated tires 60 may possibly leave behind tire wire 62, e.g., steel belt formed inside the tire. Since the tires 60 have been skewered onto the skewer rod 52, any wire 62 will be held onto the skewer rod 52 after all of the rubber has been incinerated. The remnant wire 62 can be collected, e.g., for recycling using any of the techniques described more fully herein.

Alternatively, it may be desirable to allow the wire to fall into the kiln vessel, e.g., where it is desirable to convert the wire 62 into a raw material of the cement mixture. For instance, a member 68 can be implemented as a cutter, e.g., a suitable blade or other cutting instrument, which is used to cut the wire 62 so that the cut wire 62 falls off of the skewer rod 52 and is free to fall into the kiln vessel 12.

Operation

In operation, a cycle controller controls operation of the loading mechanism 61, the skewer control 73, and fuel advancing system to load a round of tire(s) onto the skewer rod 52. Particularly, tires are fed from a conveyor system 208 that delivers tires from a suitable loading location. While on the conveyor, in certain implementations, the tires are weighed or otherwise processed to enable controlled burning cycles. The conveyor delivers tires, e.g., one at a time, to the entrance of a chute 210 that stages a tire at a second airlock door 212. In the illustrative example, the tires 60 are slid down a slight inclined conveyor section before being dropped into the chute 210 proximate to the second air lock door 212 within an air lock compartment 214. The tire 60 in the air lock compartment 214 drops into the loading chamber 206 when the second air lock door 212 opens. As such, tires 60 gravity feed from the conveyor system 208, through the airlock compartment 214 to the second airlock door 212, and through the second air lock door 212 to the tire loading chamber 206.

In an exemplary implementation, upon a queuing cycle, the first airlock door 204 closes or otherwise remains closed and the second airlock door 212 opens. Upon opening the second airlock door 212, the staged tire drops into the tire loading chamber 206. After delivering the tire, the second airlock door 212 closes. The conveyor then advances a new tire to the staging area just outside the second airlock door 212 as described more fully herein. Tires enter the tire loading chamber in a "ready position" to be loaded onto the skewer rod 52. That is, the tires drop into the tire loading chamber 206 such that the tire opening is aligned coaxially with the skewer rod 52.

During a tire loading cycle, the second airlock door 212 is closed. The first airlock door 204 opens and the skewer rod 52 extends out through the first airlock door 204 and into the tire loading chamber 206. When the skewer rod 52 has extended out appropriately, the pusher 54 pushes the tire(s) out onto the skewer rod 52. After the tire(s) 60 are pushed onto the skewer rod 52, the skewer rod 52 and the pusher 54 each retract back. The pusher 54 pulls the ram towards the back of the tire loading chamber 206. Correspondingly, the skewer rod 52 pulls back towards the passage window 202.

When the pusher 54 has retracted back and the first airlock door 204 is closed, another queuing cycle is performed. The queuing and loading cycles continuously repeat according to predetermined burn requirements.

Before the skewer rod 52 extends again through the first airlock door 204, an optional cutting operation may be performed, e.g., where necessary to cut remnant wire off of the skewer rod 52, as described more fully herein. The timing and control of the burning operation can be carried out using any of the control systems described more fully herein.

Feed Mechanism of Cantilever Skewer

Figure 12:
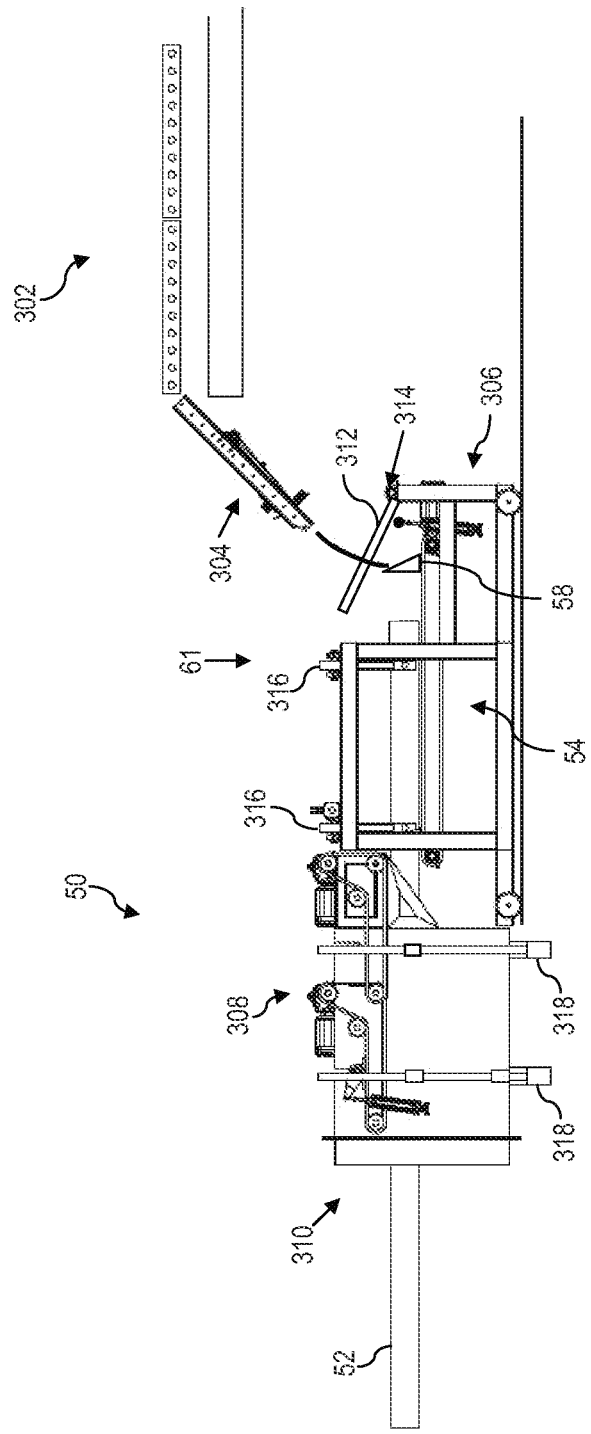
FIG. 12 is a side view of an illustrative solid fuel delivery system according to still further aspects of the present invention.

Referring to FIG. 12, a solid fuel delivery system is illustrated according to further aspects of the present invention. The illustrated system is analogous to those set out more fully herein, and particularly, with regard to the solid fuel delivery system of FIG. 4. For instance, the illustrated solid fuel delivery system includes a skewer rod 52 and a loading mechanism 61 coupled to the skewer rod 52. When installed at a kiln, the loading mechanism is positioned outside of the stationary heat transfer station, and the cantilevered end of the skewer rod 52 extends into the stationary heat transfer station, e.g., through a door, port or other suitable opening.

A conveyor system 302 is utilized to deliver solid fuel, e.g., tires, to a staging area 304 of the conveyor system 302. The staging area 304 is illustrated as an incline that gravity feeds the solid fuel to a loading mechanism 61. At an appropriate time, e.g., as determined by a control system (not shown) but analogous to the control systems such as the cycle controller 71 described more fully herein, solid fuel, e.g., a tire, but it could also be a bailed or otherwise assembled structure of combustible solid fuel, is loaded for delivery into a stationary heat transfer station.

The illustrated loading mechanism 61 includes three general sections, including a solid fuel receiving section 306, an airlock 308 and a delivery section 310. The solid fuel receiving section 306 preloads solid fuel into the loading mechanism 61, e.g., by receiving tires from the staging area 304. The airlock 308 defines an intermediate staging area for the solid fuel, such as tires, before the solid fuel is inserted into the stationary heat transfer station. The airlock 308 also provides a barrier to atmosphere for the negative pressure, high velocity and high temperature gasses within the stationary heat transfer station. The delivery section 310 is adjacent to the stationary heat transfer station. The solid fuel passes through the airlock and into the delivery section as the solid fuel advances through the wall and into the stationary heat transfer station.

The solid fuel receiving section 306 has a receiving arm 312 that pivots about a pivot point 314. In operation, the receiving arm 312 is raised so that the receiving arm 312 extends through the solid fuel positioned at the staging area 304. For instance, the receiving arm 312 extends through the hole in a tire. The receiving arm 312 is then transitioned downward to the skewer rod 52. This positions the solid fuel to slide onto a first end of the skewer rod 52.

The fuel advancing system is implemented as a pusher 54 comprising a drive system that transitions a ram 58 to advance solid fuel inserted onto the skewer rod, along the length of the skewer rod and into the heated gas stream flowing through the stationary heat transfer station of the kiln. In this regard, the ram 58 can reciprocate back and forth, or rotate, e.g., along a conveyor, belt, chain or other suitable endless drive system configuration.

The loading mechanism 61 in the illustrative example fully supports the skewer rod 52 during operation. In this regard, the loading mechanism 61 includes four controllable skewer rod clamps, which are arranged into two groups. A first pair of clamps 316 holds the skewer rod 52 in the solid fuel receiving section 306 and a second pair of clamps 318 hold the skewer rod 52 in the airlock 308 or delivery section 310.

To advance solid fuel into the airlock 308, a first airlock door between the airlock 308 and the delivery section 310 is closed, and the second pair of clamps 318 within the airlock 308 is utilized to hold the skewer rod 52. The first pair of clamps 316 is released from the skewer rod 52 and transitions out of the way of the solid fuel. The solid fuel is then advanced along the skewer rod 52, e.g., via the ram 58, through the solid fuel receiving section 306. After the solid fuel passes the first pair of clamps 316, the first pair of clamps 316 can be transitioned back to clamp and hold the skewer rod 52. Thereafter, the second pair of clamps 318 release from the skewer rod 52 and transition out of the way of the solid fuel. A second airlock door between the solid fuel receiving section 306 and the airlock 308 opens and the tires are advanced into the airlock. The second airlock door is closed before the first airlock door is opened. Once the first airlock door is open, the solid fuel is advanced along the skewer rod 52 into the stationary heat transfer station. In this illustrative implementation, at least two clamps hold the skewer rod 52 any given time.

As such, at least one clamp in the solid fuel receiving section that supports the skewer rod when tires transition from the airlock to the delivery section and at least one clamp in the airlock or delivery section supports the skewer rod when tires transition from the solid fuel receiving section to the airlock.

Figure 13:
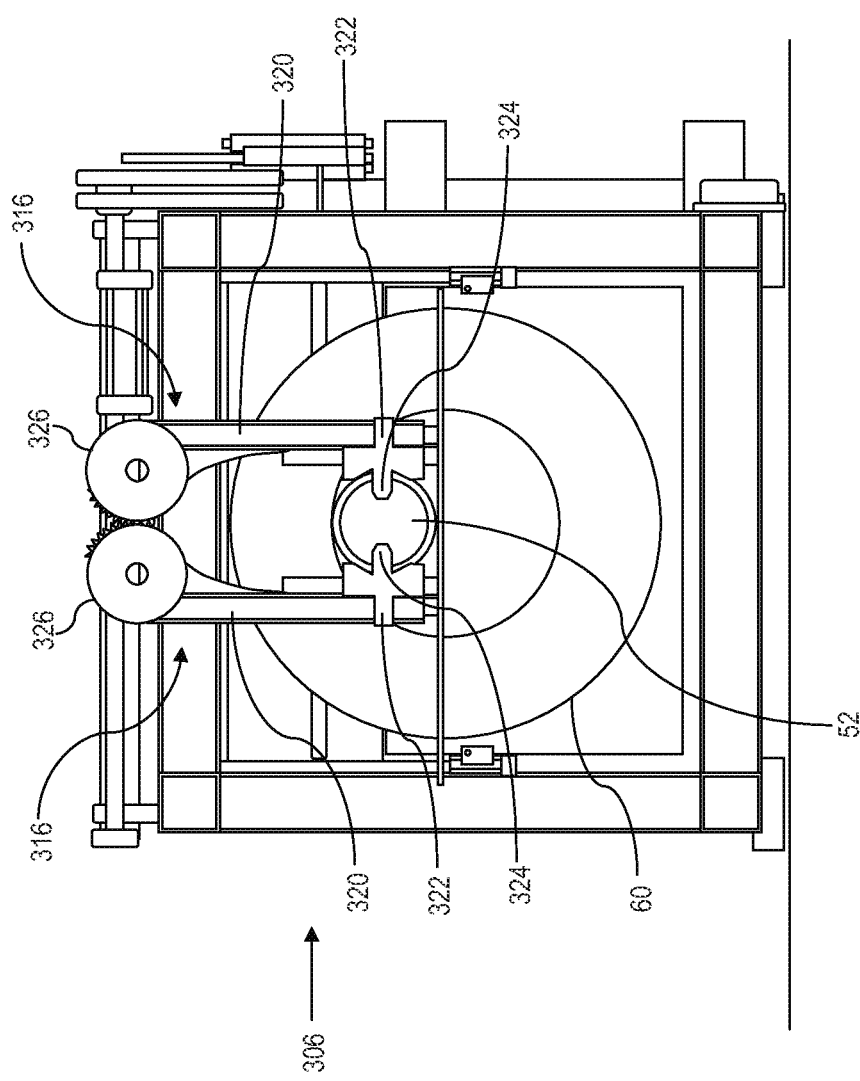
FIG. 13 is an end view of the solid fuel delivery system of FIG. 12.

Referring to FIG. 13, the skewer rod 52 is a hollow pole. For instance, the skewer rod 52 may be approximately 10 inches (25.4 cm) in diameter, having a thickness of approximately 1 inch (2.54 cm). As noted above, the heat within the stationary heat transfer station 16 can reach 1600-2000 degrees Fahrenheit (871 to 1093 degrees Celsius). Accordingly, optional manual or automatic damper(s) can be added to the skewer rod 52, e.g., to control outside ambient airflow into and through the skewer rod 52 to provide a means to cool the skewer rod 52 and to prevent damage to the skewer rod. Additionally, the damper is configured to automatically close in response to positive pressure in the stationary heat transfer station. Moreover, sensors such as thermocouples can be used to monitor the temperature of the skewer rod 52.

The clamp 316 as shown includes a pair of clamp arms 320. Each clamp arm 320 includes a holder 322 that conforms generally to a portion of the outer circumference of the skewer rod 52. Moreover, a locking pin 324 extends from each holder 322. The locking pins 324 are received by corresponding apertures in the skewer rod 52. The locking pins 324 assist to prevent longitudinal movement of the skewer arm 52. As such, each clamp grips the skewer rod 52 via the holders 322. Moreover, each clamp supports the skewer rod 52 by the locking pins 324. To release the skewer rod 52, the clamp arms 320 include meshed gear mechanisms 326. The gear mechanisms 326 rotate in the same plane, e.g., a generally vertical plane. Moreover, because each gear mechanisms 326 has a fixed center (fixed axis of rotation), and because the gear mechanisms 326 mesh, each of the arms 320 rotate in a direction that is opposite of each other.

Miscellaneous

The solid fuel delivery systems described more fully herein can be fully automated and can be operated based upon weight, number of tires per increment of time or any other factor. For instance, before being loaded onto the skewer rod 52, each tire 60 can be weighed by a weighing system. The measured weight is fed into a computer that uses a formula that computes the number of tire pounds per minute that is to be fed into the machine at the appropriate queue to time the tire incineration process.

According to still further aspects of the present invention, more than one solid fuel delivery system can be integrated into a stationary heat transfer station for a given kiln. For example, a conveyor system can be used to distribute solid fuel, e.g., tires, to multiple skewer systems, which may be distributed about the stationary heat transfer station, or co-located in a common region of the stationary heat transfer station, e.g., in the calciner.

Thus, according to various aspects of the present invention, tire derived fuel is utilized to lower operational costs of the kiln. The burning of tire derived fuel further provides environmental benefits, such as providing for the disposal of used tires. Moreover, by using the skewer system described more fully herein, preheater kilns and precalciner kilns can burn a significant amount of tires, e.g., 30-50% of the consumed fuel without the traditional severity of problems with sulfur buildup, etc.

According to various aspects of the present invention, a method of burning a tire in suspension comprises implementing an automated cycle comprising automatically loading tires onto a skewer rod positioned in a stationary heat transfer station of a kiln, where the skewer rod has a first end and a length that extends longitudinally. The automated cycle further comprises pushing the loaded tires out onto the shaft of the skewer rod into a heated gas stream through the stationary heat transfer station so that the combustible material of the tires incinerate entirely in suspension on the skewer rod. The method further comprises controlling the automated cycle to cycle a programmed amount of tires at a set rate. According to yet further exemplary aspects of the present invention, the method further comprises retrieving wire remnants left on the skewer rod by the incinerated tires and/or cutting wire remnants left on the skewer rod by the incinerated tires so that the cut wire falls off of the skewer rod.

Having thus described the invention of the present application in detail and by reference to embodiments thereof, it will be apparent that modifications and variations are possible without departing from the scope of the invention defined in the appended claims.

What is claimed is:

1. A solid fuel delivery system that delivers solid fuel into a stationary heat transfer station of a kiln, comprising:
a skewer rod having a first end and a length such that when the solid fuel delivery system is installed on the stationary heat transfer station of the kiln:
the skewer rod is utilized to suspend solid fuels in a heated gas stream flowing through the stationary heat transfer station of the kiln; and
the first end of the skewer rod is positioned outside the stationary heat transfer station and the length extends into the stationary heat transfer station; and
a fuel advancing system having a ram that advances solid fuel along the length of the skewer rod, wherein the solid fuel transitions into the heated gas stream flowing through the stationary heat transfer station of the kiln;
wherein the skewer rod restrains the solid fuel from detaching therefrom in response to force on the solid fuel generated by the heated gas stream.

2. The solid fuel delivery system according to claim 1, wherein:
the skewer rod comprises a rod having a length that extends across the width of at least one of a riser duct, a down draft calciner, a precalciner or a tertiary duct when the skewer is installed in a kiln system.

3. The solid fuel delivery system according to claim 1, wherein the skewer rod is cantilevered so as to extend into the width of at least one of a riser duct, a down draft calciner, a precalciner or a tertiary duct when the skewer is installed in a kiln.

4. The solid fuel delivery system according to claim 1, wherein:
the solid fuel comprises tires; and
the tires are inserted on the skewer rod such that the skewer rod passes through the center hole in each tire.

5. The solid fuel delivery system according to claim 4, further comprising:
a loading mechanism that automatically loads tires onto the first end of the skewer rod such that once loaded, the fuel advancing system can advance the tires along the length of the skewer rod.

6. The solid fuel delivery system according to claim 5, wherein the loading mechanism comprises at least one airlock that serves as a staging area for transitioning tires from a conveyor to the skewer rod.

7. The solid fuel delivery system according to claim 5, wherein:
the skewer rod is cantilevered from the outside of the stationary heat transfer station such that a free end of the skewer rod extends into the stationary heat transfer station; and
the skewer rod is supported towards the first end of the skewer rod such that the skewer rod is supported at the same end upon which tire are inserted onto the skewer rod.

8. The solid fuel delivery system according to claim 7, wherein:
the loading mechanism includes at least three sections, including:
a solid fuel receiving section that receives tires;
an airlock that serves as an intermediate staging area for tires before being inserted into the stationary heat transfer station;
a delivery section adjacent to the stationary heat transfer station;
the loading mechanism includes at least one clamp in the solid fuel receiving section that supports the skewer rod when tires transition from the airlock to the delivery section; and
the loading mechanism includes at least one clamp in the airlock or delivery section, that supports the skewer rod when tires transition from the solid fuel receiving section to the airlock.

9. The solid fuel delivery system according to claim 4, wherein:
the skewer rod is cantilevered from the outside of the stationary heat transfer station such that a free end of the skewer rod extends into the stationary heat transfer station; and
the skewer rod is curved or bent.

10. The solid fuel delivery system according to claim 9, wherein a controller causes a skewer rod positioning mechanism to rotate the skewer rod to a first position for loading of the solid fuel, and the controller causes the skewer rod positioning mechanism to rotate the skewer rod to a second position for dumping the remnant wire off of the skewer rod.

11. The solid fuel delivery system according to claim 4, further comprising:
a skewer control that reciprocates the skewer rod longitudinally so that an end of the skewer rod is extended outside of the stationary heat transfer station for loading tires onto the skewer rod, and the end of the skewer rod is retracted within the stationary heat transfer station for burning tires on the skewer rod.

12. The solid fuel delivery system according to claim 11, wherein the ram of the fuel advancing system pushes tires onto the skewer rod when the skewer control extends the end of the skewer rod outside the stationary heat transfer station.

13. The solid fuel delivery system according to claim 1, further comprising:
a retrieval mechanism having:
a retrieval arm that is capable of reciprocating in cooperation with the skewer rod; and
a retrieval member about an end of the retrieval arm, configured to remove wire remnants from the skewer rod.

14. The solid fuel delivery system according to claim 13, further comprising:
a cutter having a cutting arm that extends along the skewer rod generally opposite the fuel advancing system to cut wire remaining from incinerated solid fuel off the skewer rod so that the wire falls off of the skewer rod.

15. A method of delivering solid fuel into a stationary heat transfer station of a kiln, comprising:
implementing an automated cycle comprising:
automatically loading solid fuel onto a skewer rod having a first end and a length by skewering the solid fuel onto the first end of the skewer rod; and
advancing the solid fuel along the skewer rod into a stationary heat transfer station of the kiln such that the skewer rod suspends the loaded solid fuels in a heated gas stream flowing through the stationary heat transfer station and the skewer rod restrains the solid fuel from detaching therefrom in response to force on the solid fuel generated by the heated gas stream; and
controlling the automated cycle to cycle a programmed amount of the solid fuel onto the skewer arm at a set rate.

16. The method according to claim 15, wherein:
skewering the solid fuel onto the first end of the skewer rod comprises automatically loading tires as the solid fuel onto the skewer rod by inserting the tires on the skewer rod such that the skewer rod passes through the center hole in each tire.

17. The method according to claim 16, further comprising: retrieving wire remnants from the incinerated tires from the skewer arm.

18. The method according to claim 16, further comprising: cutting wire remnants left on the skewer arm by the incinerated tires so that the cut wire falls off of the skewer arm.

19. The method according to claim 15, wherein: skewering the solid fuel onto the first end of the skewer rod comprises rotating the skewer rod within the stationary heat transfer station so as to pick up at least one tire as the solid fuel onto the end of the skewer rod.

20. The method according to claim 15, further comprising: utilizing a plurality of skewer rods coupled to a skewer rod positioning mechanism;
rotating the plurality of skewer rods in a generally vertical plane so that each skewer rod rotates to pick up at least one tire as the solid fuel, rotates upward while the picked up, tire incinerates, and rotates down to a position where any remnant wire falls off the rotated down skewer rod.

\* \* \* \* \*